United States Patent
Craske

(10) Patent No.: US 8,291,002 B2
(45) Date of Patent: Oct. 16, 2012

(54) BARREL SHIFTER

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 807 days.

(21) Appl. No.: 12/457,123

(22) Filed: Jun. 1, 2009

(65) Prior Publication Data

US 2010/0306291 A1    Dec. 2, 2010

(51) Int. Cl.
*G06F 7/00* (2006.01)
*G06F 13/00* (2006.01)

(52) U.S. Cl. .................. 708/209; 710/2; 710/5; 710/8; 710/15; 710/33

(58) Field of Classification Search .......................... None
See application file for complete search history.

(56) References Cited

OTHER PUBLICATIONS

LSH 33, 32-bit Barrel Shifter with Registers, Aug. 16, 2000, Logic Device Incorporated, online, accessed on Jun. 4, 2012, URL: http://www.datasheetcatalog.org/datasheet/lodev/LSH33.pdf.*

* cited by examiner

*Primary Examiner* — Scott Sun
(74) *Attorney, Agent, or Firm* — Nixon & Vanderhye P.C.

(57) ABSTRACT

A data processing apparatus includes a register file having a set of registers for storing data values for processing by processing circuitry. The apparatus has first shift circuitry arranged to receive a data value from the register and selection circuitry is responsive to a second control signal to select between the first shifted data value and a load data value received from a memory. Second shift circuitry is arranged to receive the data value selected by the selection circuitry and is responsive to a third control signal indicating a second shift amount $S_2$ of a x (n+1) bit positions to generate a second shifted data value by shifting bit values within the received selected data value by the second shift amount $S_2$, where a is zero or an integer. The second shift circuitry is then operable to output the second shifted data value to the register file.

25 Claims, 17 Drawing Sheets

BARREL SHIFTER

BACKGROUND OF THE INVENTION

1. Field of the Invention

This invention relates to a data processing apparatus and method for handling shift operations on a data value. More particularly, this invention relates to a data processing apparatus and method in which a data value is read from a register file, shifted, and stored back into the register file.

2. Description of the Prior Art

A barrel shifter is a circuit which is operable to shift a data value by a specified number of bit positions. This can be useful in a number of ways. For instance, a barrel shifter can be used to provide hardware support for fixed-point arithmetic, where an arithmetic shift n positions to the left is equivalent to multiplying by $2^n$, and an arithmetic shift n positions to the right is equivalent to dividing by $2^n$. In this way, a multiplication or division operation can be conducted within a single processor cycle. A barrel shifter is usually implemented as a series of multiplexer stages, with each multiplexer of a stage receiving as an input an output from two multiplexers of the preceding stage. It will be appreciated that a very large number of multiplexers are required in order to shift large data values by large shift amounts.

In one arrangement the barrel shifter can be provided in two logical blocks, the first block rotating the bit values through a small number of bit positions to provide a shift (in single bit increments) of up to (for example) one byte of a four byte data word by using the multiplexer arrangements described above, and the second block providing a function of permuting the four bytes of the data word into a different order to shift the data word in byte increments. Once the rotation and permutation operations have been conducted, any bit positions vacated by the shift operation can be masked to a desired value. For example, in the case of an n bit position arithmetic shift to the left, zeroes are set by the masking operation at the n least significant bits of the shifted data value, and in the case of an n bit position arithmetic shift to the right, the sign bit of the original data value is set at the n most significant bits of the shifted data value. Alternatively, in the case of an n bit position logical shift to the left or right, zeroes are set by the masking operation at the n least significant bit or most significant bits respectively of the shifted data value.

A register file is a set of registers typically provided in, or in association with, a processor such as a central processing unit (CPU). The register file temporarily stores data while it is being operated on by the processor. For example, data may be transferred from a memory to the register file when it is required to be operated on as part of a data processing operation, and data generated by such a data processing operation may be stored to the register file before either being transferred to the memory or used by a subsequent data processing operation. In the context of a shift operation, the barrel shifter retrieves data to be shifted from the register file, operates on the retrieved data word to shift it by a required number of bit positions, and stores the shifted data word back into the register file once the shift operation has been completed.

When a data value is to be loaded from memory into the register file, for a register file which stores four byte data words it is usually necessary to load four bytes of data from memory even if only a single one of those four bytes is actually required. As a result, the desired byte of data may be at any one of the four byte positions within the register. In order that the desired byte can be used, it is then aligned to the least significant byte position within the register (for a little endian memory system), and optionally sign extended to the entire register width. As will be appreciated, switching circuitry is required in order to perform these functions.

SUMMARY OF THE INVENTION

Viewed from one aspect the present invention provides a data processing apparatus, comprising:

processing circuitry responsive to data processing instructions to execute data processing operations;

a register file having a set of registers for storing data values for processing by the processing circuitry;

first shift circuitry arranged to receive a data value from the register file and responsive to a first control signal indicating a first shift amount $S_1$ of between zero and n bit positions to generate a first shifted data value by shifting bit values within the received data value by the first shift amount $S_1$, where n is a predetermined integer;

selection circuitry responsive to a second control signal to select between the first shifted data value and a load data value received from a memory; and second shift circuitry arranged to receive the data value selected by the selection circuitry and responsive to a third control signal indicating a second shift amount $S_2$ of $a \times (n+1)$ bit positions to generate a second shifted data value by shifting bit values within the received selected data value by the second shift amount $S_2$, where a is zero or an integer, and to output the second shifted data value to the register file.

In this way, the second shift circuitry of the barrel shifter not only serves to perform byte-level shifting of a data value which has already been partially shifted by the second shift circuitry, but also serves to shift a load data value by an appropriate number of bytes to position it at the least significant byte position (for example) of a register to which the load data value is to be stored. As a result, there is no need to provide a separate load-permute data path to load data values from the memory into the register file. Accordingly, the second shift circuitry (which may be a permutation matrix) used for shifting register values can be reused for generic sign extension and load data handling.

The second shift circuitry may comprise masking circuitry responsive to a total amount of shift $S_1+S_2$ required by a data processing operation being executed to set bit values at $S_1+S_2$ most significant bit positions of the second shifted data value to a specified value. In this way, data bit values shifted in to the most significant bit positions of the shifted data word (from the least significant bit positions of the original data word) by a right shift can be masked to a specified value (zero or one).

The second shift circuitry may comprise masking circuitry responsive to a total amount of shift $S_1+S_2$ required by a data processing operation being executed to set bit values at $S_1+S_2$ least significant bit positions of the second shifted data value to a specified value. In this way, data bit values shifted in to the least significant bit positions of the shifted data word (from the most significant bit positions of the original data word) by a left shift can be masked to a specified value (zero or one).

The specified value may be determined in dependence on the type of data processing operation being executed. In particular, the type of data processing operation being executed may be one of a logical shift and an arithmetic shift. In the case of a logical shift, the specified value will be zero. In the case of an arithmetic shift, the predetermined value will be zero for a left shift or equal to the sign bit of the original data word for a right shift.

The data processing apparatus may comprise zero-detection circuitry coupled to the second shift circuitry which receives the second shifted data value and determines whether the second shifted data value is zero. This enables a zero flag to be set in a status register, for use by the processor in subsequent data processing operations.

As an example, instructions for checking to see if register "r0" contains a word aligned address, which will be the case when bits [1:0] are both zero, could be provided as follows:

```
LSLS r1,r0,#30   // shift r0 left 30 bits and set flags (place unused result
                 in r1)
                 // zero flag will be set if bits [1:0] are clear
BEQ ok           // branch to "ok" if result was zero (zero flag set)
```

As will understood, this example performs a left shift to remove the bit values other than those present at the two least significant bit positions of the input data word stored at register r0, and then utilises the result specified in the zero flag to determine whether bits [1:0] are both zero. The actual result of the shift operation itself which is stored into the register r1 is not used.

The data processing apparatus may comprise sign-detection circuitry coupled to the second shift circuitry to receive the most significant bit of the second shifted data value and set a sign flag in dependence on whether the most significant bit of the second shifted data value is negative. This enables a sign flag to be set in the status register, for use by the processing in subsequent data processing operations.

The data processing apparatus may comprise carry-detection circuitry coupled to the second shift circuitry to receive the most significant bit and the least significant bit of the second shifted data value and set a carry flag to either the most significant bit or the least significant bit of the second shifted data in dependence on the direction of the shift. This enables a carry flag to be set in the status register, for use by the processing in subsequent data processing operations.

As an alternative, the first shift circuitry rather than the second shift circuitry may comprise bit level masking circuitry. In this case, the masking circuitry of the first shift circuitry is responsive to the amount of shift $S_1$ indicated by the first control signal to set bit values at $S_1$ most significant bit positions of the first shifted data value to a specified value. In this way, data bit values shifted in to the most significant byte of the partially shifted data word (from the least significant bit positions of the original data word) by a right shift can be masked to a specified value (zero or one). This enables bit level masking to be carried out only on the most significant byte of the data word.

In this case, the second shift circuitry may be responsive to the amount of shift $S_2$ indicated by the third control signal to set bit values at one or more groups of n+1 most significant bit positions of the second shifted data value to the specified value. This enables byte level masking to be carried out on the remaining bytes of the data word. More particularly, this enables a combined permute and mask operation to be performed.

Similarly, the first shift circuitry may comprise masking circuitry responsive to the amount of shift $S_1$ indicated by the first control signal to set bit values at $S_1$ least significant bit positions of n+1 most significant bits of the first shifted data value to a specified value.

In this case, the second shift circuitry may be responsive to the amount of shift $S_2$ indicated by the third control signal to set bit values at one or more groups of n+1 least significant bit positions of the second shifted data value to the specified value.

The data processing apparatus may comprise zero detection circuitry coupled to the first shift circuitry to receive the first shifted data value and to set a zero flag to indicate a zero value for the second shifted data value when each group of (n+1) bits of the first shifted data value either has a value of zero, or will be replaced with a value of zero by the second shift circuitry. This enables a zero flag to be set in a status register, for use by the processor in subsequent data processing operations. By providing the zero detection circuitry following the first shift circuitry rather than the second shift circuitry, the zero detection circuitry exists outside the critical path of the load data which does not require zero detection, resulting in a reduction in the gate count for the load data critical path.

Similarly, the data processing apparatus may comprise sign-detection circuitry coupled to the first shift circuitry to receive the most significant bit of each group of (n+1) bit positions of the first shifted data value and to set a sign flag to indicate a positive value if the most significant bit of the group of (n+1) bit positions which is to be shifted into the most significant bit position by the second shift circuitry has a value of one, or if the bit values of that group of (n+1) bit positions are to be set to a value of one by the second shift circuitry. This enables a sign flag to be set in the status register, for use by the processor in subsequent data processing operations. By providing the sign detection circuitry following the first shift circuitry rather than the second shift circuitry, the carry detection circuitry exists outside the critical path of the load data which does not require carry detection, resulting in a reduction in the gate count for the load data critical path.

The data processing apparatus may comprise carry-detection circuitry coupled to the first shift circuitry to receive the most significant bit and the least significant bit of each group of (n+1) bit positions of the second shifted data value and set a carry flag to one of the received most significant bits or least significant bits in dependence on the amount and direction of the shift. This enables a carry flag to be set in the status register, for use by the processor in handling the shifted data value stored in the register file. By providing the carry detection circuitry following the first shift circuitry rather than the second shift circuitry, the carry detection circuitry exists outside the critical path of the load data which does not require carry detection, resulting in a reduction in the gate count for the load data critical path.

The processing circuitry may comprise the first shift circuitry and the second shift circuitry. Alternatively, the processing circuitry and the first and second shift circuitry may be provided separately.

In the embodiments described herein, the various stages of rotation circuitry, masking circuitry, permutation circuitry and detection circuitry each receive control signals from a centralised control circuit. However, it will be appreciated that several of the same control signals (for example those indicating an amount of shift), could be provided once to an early stage of the shift circuitry, and passed downstream to subsequent stages. Furthermore, the control circuitry could be distributed between the various stages of the shift circuitry rather than being centralised.

Viewed from another aspect the present invention provides a data processing apparatus, comprising:

processing means responsive to data processing instructions to execute data processing operations;

register means having a set of registers for storing data values for processing by the processing means;

first shift means arranged to receive a data value from the register means and responsive to a first control signal indicating a first shift amount of between zero and n bit positions to generate a first shifted data value by shifting bit values within the received data value by the first shift amount, where n is a predetermined integer;

selection means responsive to a second control signal to select between the first shifted data value and a load data value received from a memory; and second shift means arranged to receive the data value selected by the selection means and responsive to a third control signal indicating a second shift amount of a×(n+1) bit positions to generate a second shifted data value by shifting bit values within the received selected data value by the second shift amount, where a is zero or an integer, and to output the second shifted data value to the register means.

Viewed from another aspect the present invention provides a data processing apparatus, comprising:

a step of executing data processing operations using a register file having a set of registers in response to data processing instructions;

a step of receiving, at first shift circuitry, a data value from the register file;

a step of generating, at the first shift circuitry, a first shifted data value by shifting bit values within the received data value by a first shift amount of between zero and n bit positions in response to a first control signal indicating the first shift amount, where n is a predetermined integer;

a step of selecting between the first shifted data value and a load data value received from a memory in response to a second control signal;

a step of receiving, at second shift circuitry, the data value selected at the step of selecting;

a step of generating, at the second shift circuitry, a second shifted data value by shifting bit values within the received selected data value by a second shift amount of a×(n+1) bit positions in response to a third control signal indicating the second shift amount, where a is zero or an integer; and a step of outputting the second shifted data value to the register file.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
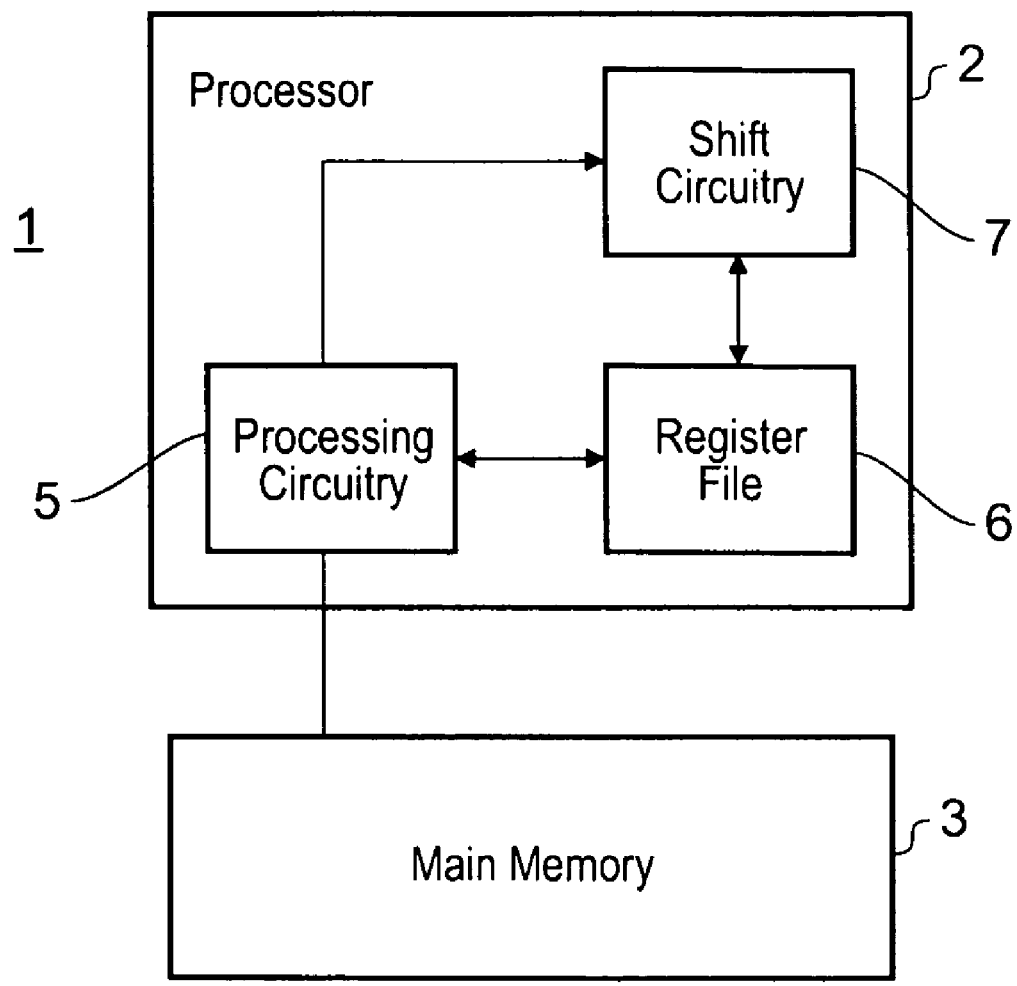
FIG. 1 schematically illustrates a data processing apparatus comprising a barrel shifter for conducting shift operations on data words stored in a register file.

Referring to FIG. 1, a data processing apparatus 1 is schematically illustrated. The data processing apparatus may for instance be a personal computer or a consumer electronic device such as a mobile phone or PDA. The data processing apparatus 1 comprises a processor 2 and a main memory 3. The processor 2 comprises processing circuitry 5 for executing data processing operations in response to data processing instructions. The processor 2 also comprises a register file 6 for temporarily storing data values from the main memory 2 to be operated on by the processing circuitry 5. The register file 6 is also able to store data values generated by the processing circuitry 5, so that they can either be reused by the processing circuitry 5 or written into the main memory 2. The processor 2 also comprises shift circuitry 7 for shifting data values retrieved from the register file 6 by a number of bit positions specified by the processing circuitry 5. Typically a single register within a register file stores a single word of data. In the embodiments described herein, a word of data comprises 4 bytes of data, and a byte of data comprises 8 bits of data.

In this case, a data word can be meaningfully shifted by between 0 bits (no shift) and 31 bits. A greater shift can be applied, but in the case of a logical or arithmetic shift will effectively shift out (either to the left or the right, depending on the direction of the shift) all of the original data bits.

It will be appreciated that the present invention would also be applicable to an architecture which uses different word lengths and/or byte lengths, and to a data processing apparatus in which a single register of the register file stores more or less than one word of data.

In the embodiments described herein, the shift circuitry 7 only shifts the data word to the right. This is because, in the case of a shift operation conducted on a 32 bit data word, an n-bit shift to the left is equivalent to a 32-n bit shift to the right if the shift operation is implemented as a rotation. The difference between an n-bit shift to the left and a 32-n bit shift to the right occurs only in the masking operation conducted once the shift itself has been completed. Providing only right shifting enables the shift circuitry itself to be simplified.

First Embodiment of the Shift Circuitry

Figure 2:
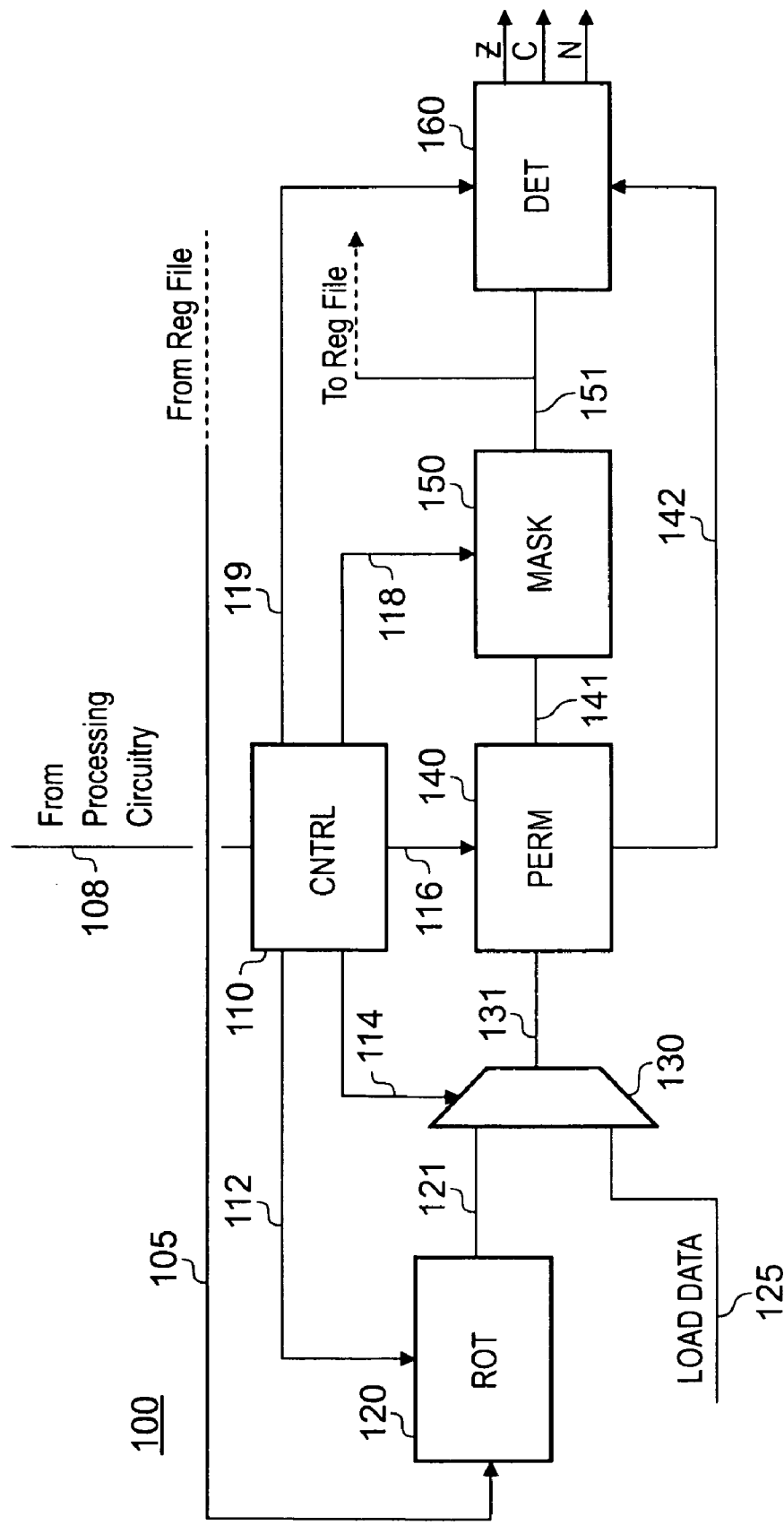
FIG. 2 schematically illustrates a barrel shifter according to a first embodiment.

Referring to FIG. 2, example shift circuitry 100 according to a first embodiment is schematically illustrated. The shift circuitry 100 comprises control circuitry 110 for controlling the operation of the shift circuitry 100 in dependence on the type of shifting operation and the amount of shift required, this information being provided to the control circuitry 110 by the processing circuitry 5 illustrated in FIG. 1 via a signal line 108. The shift circuitry 100 comprises rotation circuitry 120 (first shift circuitry) which is arranged to receive a data value from the register file 6 of FIG. 1 on a signal line 105, and which is operable in response to a first control signal 112 generated by the control circuitry 110 which represents a first shift amount $S_1$ of between zero and n bit positions, to generate a first shifted data value by shifting bit values within the received data value by the first shift amount $S_1$. It will be appreciated that n is a predetermined integer. The rotation circuitry 120 is intended to provide bit level shifting, with byte level shifting being provided by a later stage of the shift circuitry 100 (as will be described later). A byte usually consists of 8 bits, and in such a case the value of n would be 7, because an 8 bit (one byte) shift would be handled by the later stage. In the case of a 32 bit input data word, the rotation circuitry 120 would serve to shift the 32 bit word by between 0 (no shift) and 7 (full shift) bits.

The shift circuitry 100 further comprises a multiplexer 130 (selection circuitry) which is responsive to a second control signal 114 generated by the control circuitry 110 to select between the first shifted data value generated by the rotation circuitry 120 and received on an input line 121 and a load data value received from the memory 3 via the load data line 125. The second control signal 114 will select which input of the multiplexer 130 to pass to the next stage of the shift circuitry 100 on an output line 131 in dependence on the type of data processing operation being conducted (e.g. load data operation vs. arithmetic or logical shift operation). As will be appreciated, while a data value retrieved from the register file to be shifted may require any shift amount at a bit-level granularity, a load data value to be stored from the main memory 3 into the register file 6 of FIG. 1 only requires byte level shifting in order to align a desired byte of the load data value at the least significant byte position of a register. Accordingly, the load data does not pass through the rotation circuitry 120.

Permutation circuitry 140 (second shift circuitry) is arranged following the multiplexer 130 to receive, via the line 131, the data value selected by the multiplexer 130. The permutation circuitry 140 is responsive to a third control signal 116 generated by the control circuitry 110 representing a second shift amount $S_2$ of a×(n+1) bit positions to generate a second shifted data value for output on a signal line 141 by shifting bit values within the received selected data value by the second shift amount $S_2$. It will be appreciated that the value of a may be zero (if the total amount of shift required is less than one byte) or an integer. The second shift amount $S_2$ will therefore be an integer number of bytes (or zero), in contrast with the first shift amount $S_1$ which is an integer number of bits (or zero). The permutation circuitry also outputs at least the most significant bit and the least significant bit of the second shifted data value directly to the detection circuitry 160 on a signal line 142 as will be described subsequently with reference to FIGS. 6 and 8.

Accordingly, in combination, the rotation circuitry 120 and the permutation circuitry 140 are able to provide a full range of shift. For example, for a 32 bit (four byte) data word (retrieved from a 32 bit register), $S_1$ will be in the range of 0 to 7 bits, whereas $S_2$ will be in the range of 0 to 3 bytes (0, 8, 16 or 24 bits). In combination this provides a range of 0 to 31 bit positions of shift (31=24+7).

Masking circuitry 150 is arranged to receive the shifted data value produced by the permutation circuitry 140 via the signal line 141. The masking circuitry 150 sets the bits shifted in to the data value to a particular value (0 or 1) in dependence on a fourth control signal 118 generated by the control circuitry 110. The particular value selected by the masking circuitry depends on the type of shift (arithmetic or logical), and whether the shift is a left shift or a right shift (as indicated above, a left shift is implemented in the example architecture by way of a complementary right shift, but would be masked differently to a right shift). In particular, an arithmetic left shift would be masked by setting the shifted in least significant bits (which have wrapped around from the most significant bit positions) to a value of zero, and an arithmetic right shift would be masked by setting the shifted in most significant bits (which have wrapped round from the least significant bit positions) to match the sign bit of the original data value. Furthermore, a logical shift to the left or right would be masked by setting the shifted in least significant bits and most significant bits respectively to a value of zero. The masking circuitry 150 then outputs the masked and shifted data value on an output line 151 to the register file 6 for storage to a register thereof, and also to detection circuitry 160.

The detection circuitry 160 comprises several separate circuits which set flags indicative of various characteristics of the data value which is being stored into the register file. In particular, the detection circuitry 160 comprises zero-detection circuitry for detecting whether the value being stored into the register file is a zero or non-zero value, and setting a zero-flag accordingly. The detection circuitry 160 also comprises carry detection circuitry for detecting the last bit to be shifted out of the most significant bit position (and therefore out of the data value), and setting a carry flag accordingly. The detection circuitry 160 also comprises sign detection circuitry for detecting whether the value being stored in the register file is a negative value, and setting a negative flag accordingly. The flags thus set can be used (tested) by the processing circuitry 5 to determine whether or how a data processing instruction is to be executed (that is, execution of the instruction may be contingent on the value of the zero, carry or negative flags). The flags may then be set in a status register within the register file. The control circuitry 110 applies a fifth control signal 119 to the detection circuitry 160 to control the various detection operations.

Figure 3:
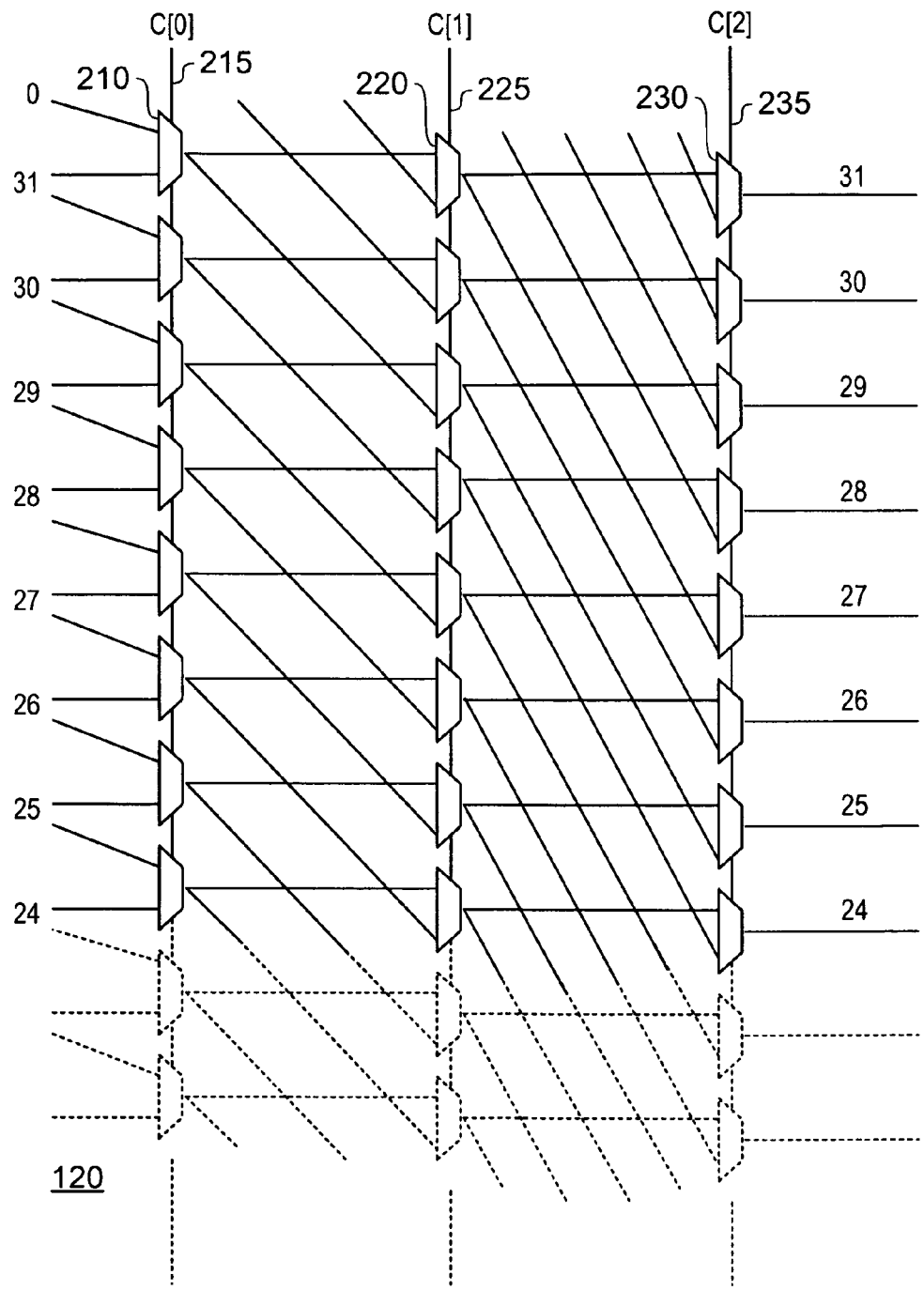
FIG. 3 schematically illustrates rotation circuitry for conducting bit level shifting.

Referring now to FIG. 3, an example implementation of the rotation circuitry 120 of FIG. 2 is schematically illustrated. Only a portion of the rotation circuitry is shown for the sake of clarity. As will be appreciated from the following description, the rotation circuitry 120 implements a shift operation as a rotation to the right, which will result in bit values shifted out of the least significant bit position of a data word being shifted into the most significant bit positions of the data word. The rotation circuitry 120 comprises a three-stage multiplexer arrangement comprising a first multiplexer array 210, a second multiplexer array 220 and a third multiplexer array 230. The first multiplexer array 210 comprises 32 multiplexers (in the case of a 32 bit data value) each receiving the values at two adjacent bit positions of the input data value. For example, the top-most multiplexer of the first multiplexer array has as its input the values stored at bit position 0 (least significant bit position of the input data value) and bit position 31 (most significant bit position of the input data value), whereas the adjacent multiplexer of the first multiplexer array 210 has as its input the values stored at bit position 31 and bit position 30.

All of the multiplexers of the first multiplexer array 210 are able to select between their two inputs in response to a control signal c[0] applied via the control line 215. The output of each multiplexer of the first multiplexer array 210 is connected to the inputs of two multiplexers of the second multiplexer array 220. In particular, the output of a multiplexer of the first multiplexer array is connected to the input of a corresponding multiplexer of the second multiplexer array (at the same bit position) and also to the input of a multiplexer of the second multiplexer array 220 two bit positions lower.

All of the multiplexers of the second multiplexer array 220 are able to select between their two inputs in response to a control signal c[1] applied via the control line 225. The output of each multiplexer of the second multiplexer array 220 is connected to the inputs of two multiplexers of the third multiplexer array 230. In particular, the output of a multiplexer of the second multiplexer array 220 is connected to the input of a corresponding multiplexer of the third multiplexer array 230 (at the same bit position) and also to the input of a multiplexer of the third multiplexer array 230 four bit positions lower.

All of the multiplexers of the third multiplexer array 230 are able to select between their two inputs in response to a control signal c[2] applied via the control line 235. The output of each multiplexer of the third multiplexer 230 provides one bit of the rotated data value. It will be apparent from FIG. 3 and the above description that the control line 215 is able to select between a shift amount of zero and one bit positions, the control line 225 is able to select between a shift amount of zero and two bit positions, and the control line 235 is able to select between a shift amount of zero and three bit positions. Accordingly, the total amount of shift provided by the three-stage multiplexer arrangement ranges from zero bit positions (all three control lines indicating zero shift) to 7 bit positions (1+2+4=7).

Figure 4:
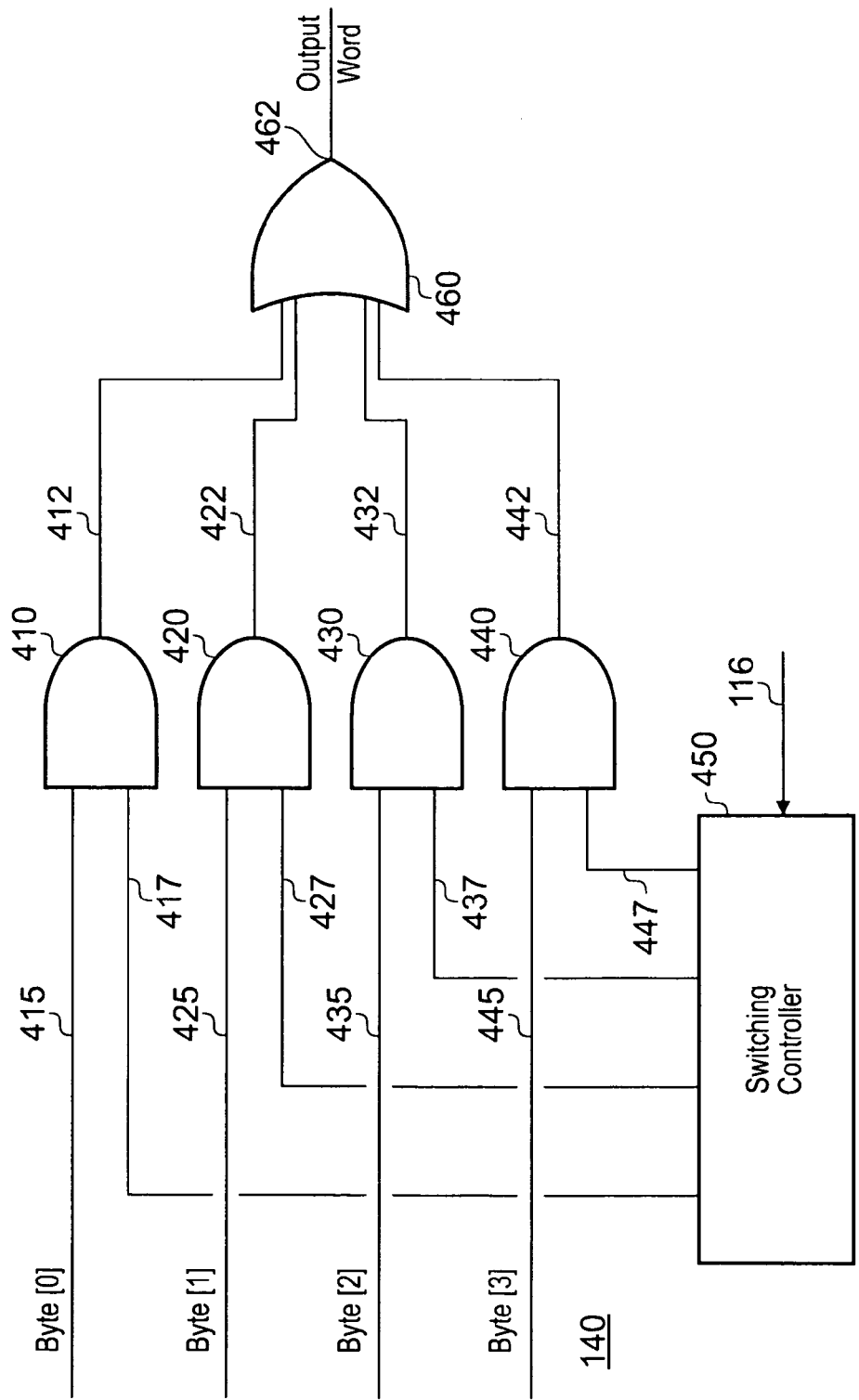
FIG. 4 schematically illustrates permutation circuitry for conducting byte level shifting according to the first embodiment.

Referring to FIG. 4, an example of the permute circuitry 140 of FIG. 2 is schematically illustrated. The permute circuitry 140 comprises four AND gates 410, 420, 430, 440 which receive the four bytes which make up the output of the multiplexer 130. In particular, the first AND gate 410 receives the first byte (8 MSBs) of the output of the multiplexer 130 on an input line 415, the second AND gate 420 receives the second byte of the output of the multiplexer 130 on an input line 425, the third AND gate 430 receives the third byte of the output of the multiplexer 130 on an input line 435, and the fourth AND gate 440 receives the fourth byte (8 LSBs) of the output of the multiplexer 130 on an input line 445.

The permute circuitry 140 also comprises a switching controller 450 which selects between the AND gates 410, 420, 430, 440 for output, via respective output lines 412, 422, 432, 442, to an OR gate 460 which performs a logical OR operation to output a permuted data word to the masking circuitry 150 via an output line 462. More particularly, the switching controller outputs control signals to the AND gates 410, 420, 430, 440 on respective input lines 417, 427, 437, 447 which are then subject to a logical AND operation with the data values at the input lines 415, 425, 435, 445. In this way, by asserting a zero value on three of the input lines 417, 427, 437, 447, the respective AND gates will output a value of zero onto their respective output lines, and by asserting a value of one on the remaining input line, the output of the AND gate corresponding to the remaining input line will be that of the byte value received at the respective input line. The switching controller 450 is thus able to control the order in which the input bytes on the input lines 415, 425, 435, 445 are output to the OR gate 460.

In this way, the permute circuitry provides a shifting function. A shift to the right of one byte (8 bits) can be implemented by the switching controller 450 by applying a value of one firstly to the input line 447 (and a value of zero to each of the input lines 417, 427, 437) in order to firstly output the fourth byte of the input data word (which will be shifted in to the first byte position of the output data word) onto the output line 442. Then, once the fourth byte of the input data word has been outputted by the OR gate 460 as the first byte of the output data word, the switching controller 450 will apply a value of one to the input line 417 (and a value of zero to each of the input lines 427, 437, 447) in order to output from the OR gate 460 the first byte of the input data word as the second byte of the output data word. Similarly, the switching controller 450 will subsequently apply a value of one to the input lines 427 and 437 to output the second and third bytes of the input data word as the third and fourth bytes of the output data word respectively. The same principle applies when a shift of two bytes (16 bits) or three bytes (24 bits) is required.

Figure 5:
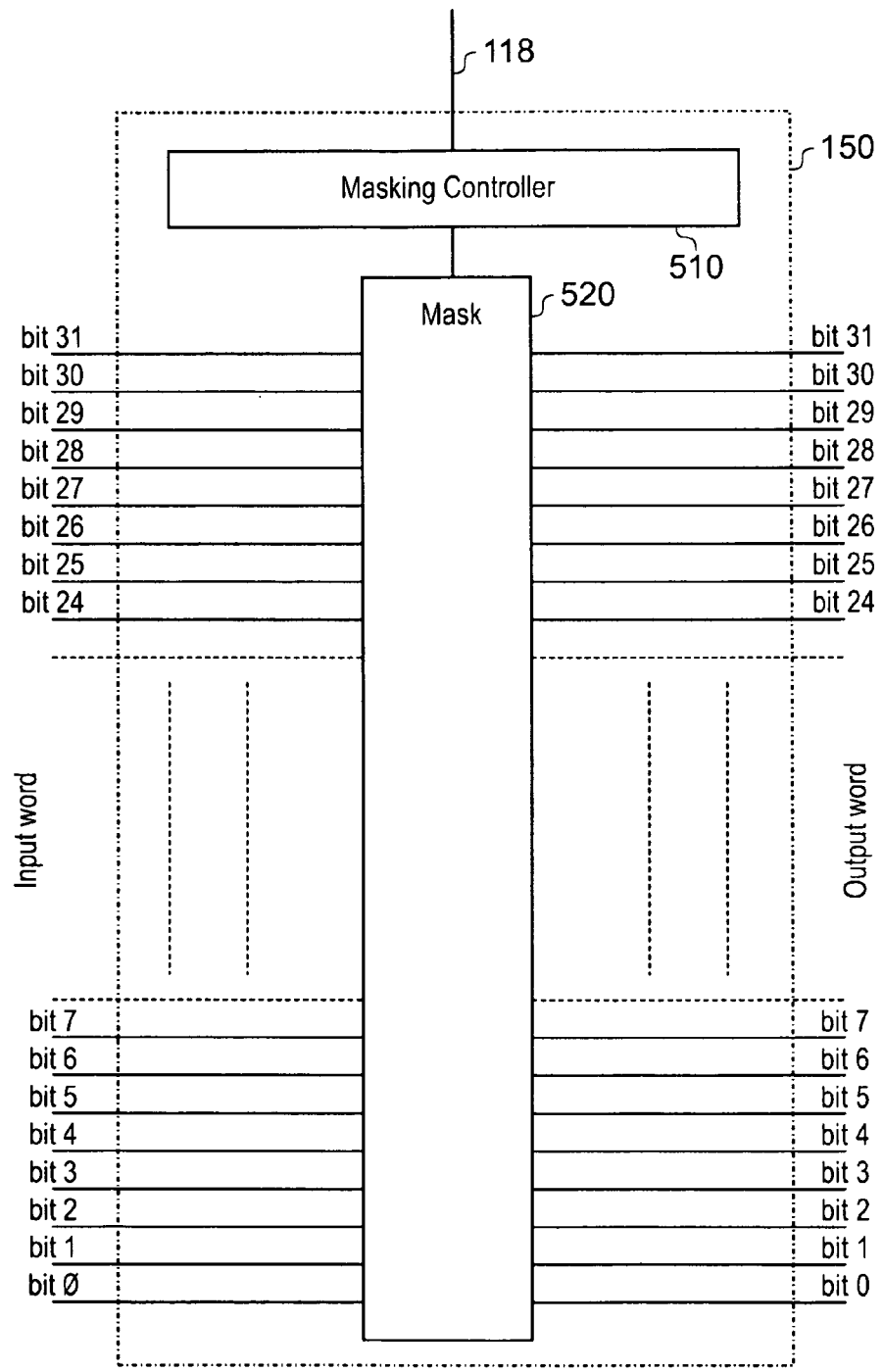
FIG. 5 schematically illustrates masking circuitry according to the first embodiment for masking the shifted data word.

Referring to FIG. 5, an example of the masking circuitry 150 of FIG. 2 is schematically illustrated. In FIG. 5, a masking controller 510 is shown which receives control signals 118 from the control circuitry 110 of FIG. 2, and which controls the operation of a mask 520 which serves to selectively mask the bit values of the data word outputted from the permutation circuitry 140. In particular, the masking controller 510 receives the control signal 118 from the control circuitry 110 which indicates the total amount of shift $(S_1+S_2)$, the direction of shift (left or right), and the type of shift operation (logical or arithmetic). The direction of shift and the type of shift are together used to determine the predetermined value to which shifted in bit values are to be masked. Specifically, for an arithmetic left shift a predetermined value of zero will be set in the mask, for an arithmetic right shift a predetermined value would be set to match the sign bit of the original (unshifted) data value, and for a logical left or right shift a predetermined value of zero will be set in the mask. The direction of shift and the total amount of shift are together used to determined which bits of the mask should be applied to replace the input data bits of the data word. For example, for a 5 bit shift to the right, the 5 MSBs (bits 27 to 31) will be replaced with the predetermined value set in the mask, and for a 5 bit shift to the left, the 5 LSBs (bits 0 to 4) will be replaced with the predetermined value set in the mask.

At the left hand side of FIG. 5, each of bits 0 to 31 of the data word is input to the mask 520. As set out above, the mask 520 serves to select between each input data bit and a predetermined value specified in the mask 520 under the control of the masking controller 510. By selectively applying the mask, each of bits 0 to 31 of the data word output from the mask 520 (shown at the right hand side of FIG. 5) will either retain its original (unmasked) value, or will have the masked (predetermined) value. The output data word is then passed to the register file 6 and the detection circuitry 160.

Figure 6:
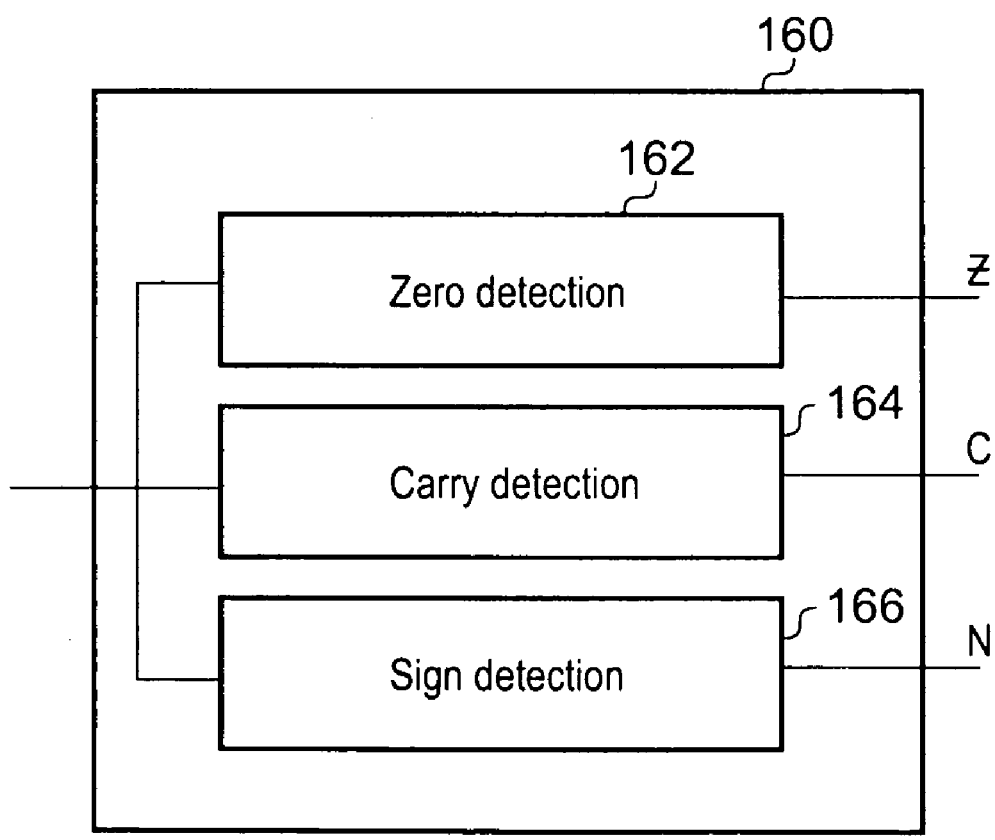
FIG. 6 schematically illustrates detection circuitry according to the first embodiment.

Referring to FIG. 6, the detection circuitry 160 shown in FIG. 2 is schematically illustrated in more detail, showing several of the component detection circuits for setting the various status flags. In particular, the detection circuitry 160 comprises zero detection circuitry 162 for setting a flag (z) indicative of whether the data word being written into the register file has a zero value, carry detection circuitry 164 for setting a flag (C) indicative of the last bit shifted out of the data word (effectively bit 32), and sign detection circuitry 166 for setting a flag (N) indicative of whether the data word being written into the register file has a positive or negative value. The flags generated by the zero detection circuitry 162, the carry detection circuitry 164 and the sign detection circuitry 166 are output by the respective circuits and stored into a status register within the register file. Each of the zero detection circuitry 162, the carry detection circuitry 164 and the sign detection circuitry 166 will now be described with reference to FIGS. 7, 8 and 9 respectively.

Figure 7:
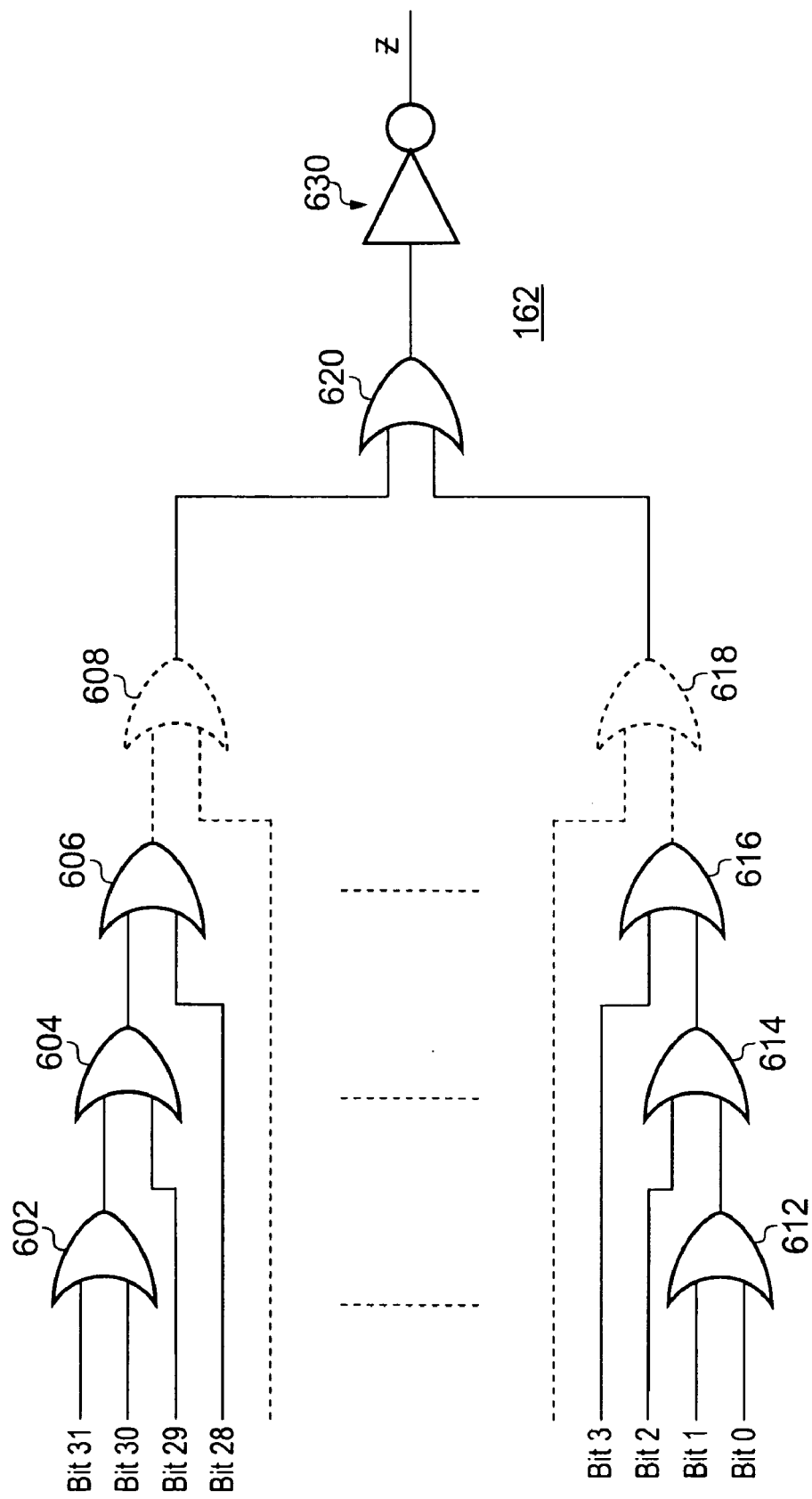
FIG. 7 schematically illustrates zero detection circuitry according to the first embodiment.

Referring to FIG. 7, an example of the zero-detection circuitry 162 shown in FIG. 6 is schematically illustrated. The function of the zero-detection circuitry 162 is to determine whether the data word which is being stored into the register file has a zero value or a non-zero value, and to output a flag (z) to indicate this. The flag may then be stored in the register file (for example) as part of a status register. It will be understood that the data word will have a zero value only if every bit of the data word has a value of zero. In this case, the zero flag will be set to z=1. Otherwise the data word will be considered to have a non-zero value, and the zero flag will be set to z=0.

In operation, all of the bits of the data word are subject to an OR operation using an arrangement of OR gates. In particular, bits 30 and 31 of the data word are subject to an OR operation at an OR gate 602, the output of which is subject to an OR operation with bit 29 at an OR gate 604. The output of OR gate 604 is then subject to an OR operation with bit 28 at an OR gate 606. This arrangement continues down to bit 16 using a further series of OR gates represented by an OR gate 608. The output of this arrangement is then passed to a final OR gate 620.

In the other half of the zero detection circuitry, bits 0 and 1 of the data word are subject to an OR operation at an OR gate 612, the output of which is subject to an OR operation with bit 2 at an OR gate 614. The output of OR gate 614 is then subject to an OR operation with bit 3 at an OR gate 616. This arrangement continues up to bit 15 using a further series of OR gates represented by an OR gate 618. The output of this arrangement is then passed to the final OR gate 620. The OR gate 620 therefore receives as a first input value the result of subjecting the bits 16 to 31 to an OR operation, and receives as a second input value the result of subjecting bits 0 to 15 to an OR operation. Accordingly, if both the first input value and the second input value are zero, then the OR gate 620 will output a zero value. The value output by the OR gate 620 is then inverted by an inverter 630, resulting in the zero flag value z. It will be appreciated from this arrangement that z=1 if all of the bits of the data word are zero, otherwise z=0.

Figure 8:
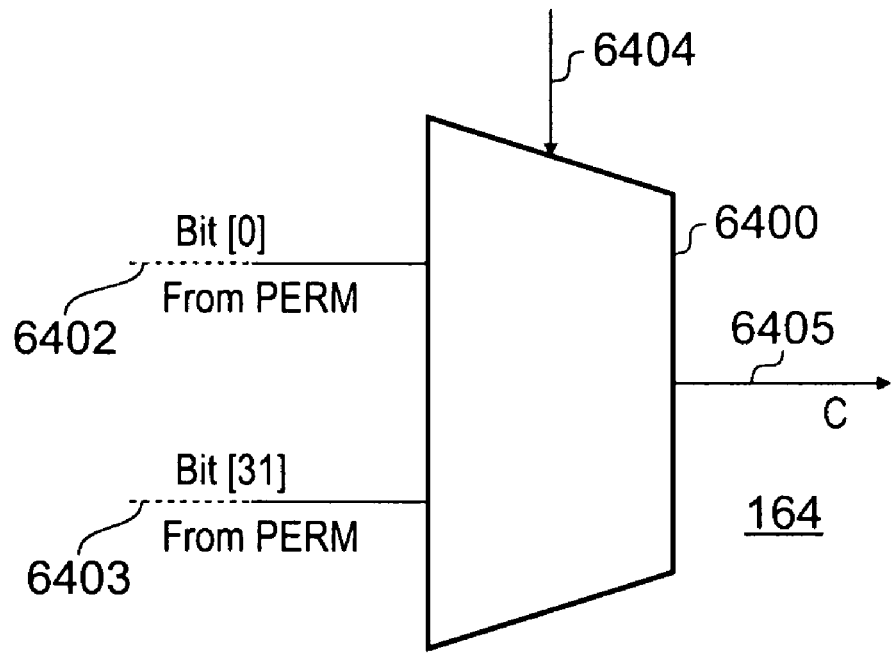
FIG. 8 schematically illustrates carry detection circuitry according to the first embodiment.

Referring to FIG. 8, an example implementation of the carry detection circuitry 164 shown in FIG. 6 is schematically illustrated. The function of the carry-detection circuitry 164 is to determine the value of the last bit to be shifted out from either the most significant bit position (in the case of a left shift) or the least significant bit position (in the case of a right shift) of the input data word, and to output a carry flag (C) to indicate this. The carry flag may then be stored in the register file (for example) as part of a status register. The carry detection circuitry 164 comprises a multiplexer 6400 which receives bits 0 and 31 output by the permute circuitry 140 on respective signal lines 6401, 6402. The multiplexer 6400 is responsive to a select signal received from the control circuitry 110 via a select signal line 6404 to select between the received bits 0 and 31. The select signal indicates the direction of shift being applied by the barrel shifter. In the case of a right shift the select signal will cause the multiplexer 6400 to select bit 0/ for output, whereas in the case of a left shift the select signal will cause the multiplexer to select bit 31 for output. This is because in the case of a right shift the last data value being shifted out from bit position 31 will be rotated into bit position 0, and in the case of a left shift the last data value being shifted out from bit position 0 will be rotated into bit position 31. The bit value selected will then be output on an output signal line 6405 as the carry flag C to be written to the register file. It will be appreciated that the carry detection circuitry 164 is required to operate on the signal prior to masking because the masking operation will overwrite the bit values stored at bit position 0 (in the case of a right shift) and at bit position 31 (in the case of a left shift).

Figure 9:
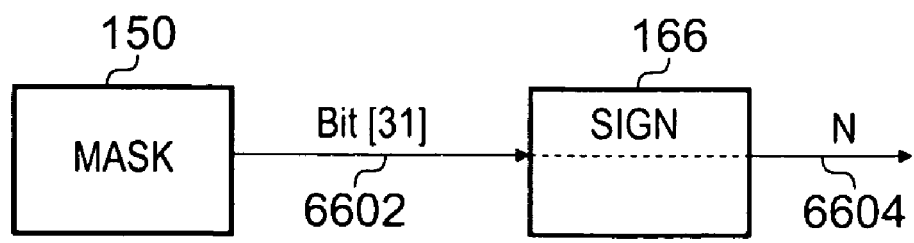
FIG. 9 schematically illustrates sign detection circuitry according to the first embodiment.

Referring to FIG. 9, an example implementation of the sign detection circuitry 166 shown in FIG. 6 is schematically illustrated. The function of the sign detection circuitry 162 is to determine whether the data word which is being stored into the register file has a negative value or a positive value, and to output a flag (N) to indicate this. The flag may then be stored in the register file (for example) as part of a status register. The sign detection circuitry 166 receives bit 31 generated by the masking circuitry 150 on a signal line 6602, and outputs the value of bit 31 as the sign flag N on an output signal line 6604. It will therefore be appreciated that in the case of the first embodiment, sign detection is easily conducted simply by setting the sign flag N equal to bit 31 of the data value being stored to the register file. The sign flag N so set is then itself written to the register file as described above.

Figure 10:
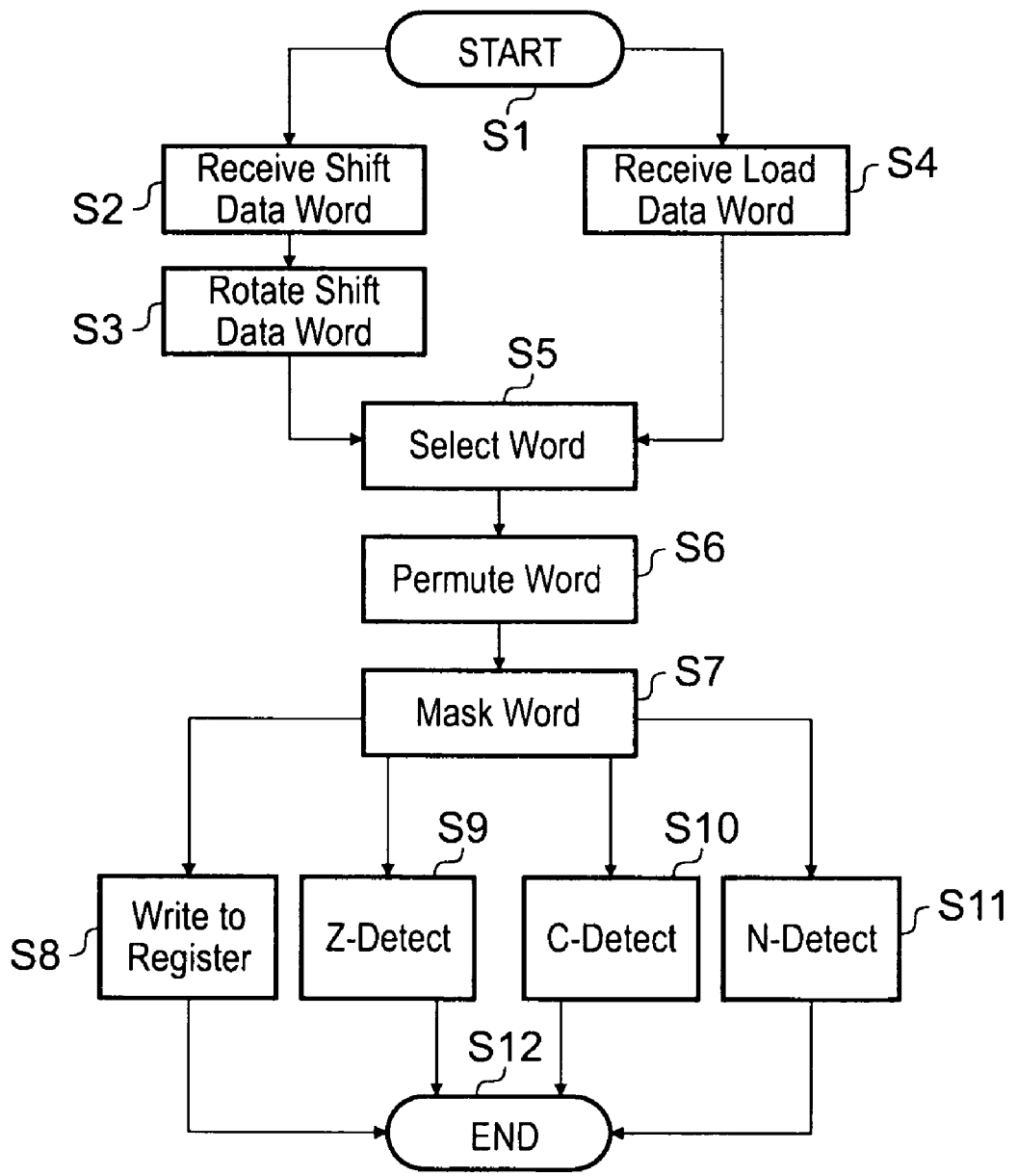
FIG. 10 is a schematic flow diagram illustrating a shifting method according to the first embodiment.

Referring to FIG. 10, an example shift operation in accordance with the first embodiment is schematically illustrated by way of a flow diagram. The process starts at a step S1 with the receipt by the processing circuitry 5 of a data processing instruction requiring either a shift operation in respect of a data word stored in the register file 6 or a load instruction for loading a data value from the main memory 3 into the register file 6. Where the instruction requires a shift operation, the process moves on to a step S2 where the shift circuitry 7 receives from the register file a data word to be shifted. At a step S3, the received data word is shifted by a number of bits derived from the data processing instruction by the control circuitry 110. This number of bits is between 0 (no shift) and 7 (maximum bit level shift). The shifted data word is then applied to an input of the multiplexer 130. Alternatively, where the instruction requires a load operation, the process moves from the step S1 to a step S4, where a data word is retrieved from the main memory 3 and is applied to another input of the multiplexer 130.

At a step S5, the multiplexer 130 selects between the shifted data word and the load data applied at its respective inputs under the control of the control circuitry 110, which determines which input to select in dependence on the data processing instruction being executed. At a step S6, the selected data word is passed to the permutation circuitry 140 for byte-level shifting whereby the bytes of the selected data word are permuted into different positions in dependence on the amount of shift (in bytes) required and the direction of the required shift. Then, at a step S7, the permuted data word is passed to the masking circuitry 150 where shifted in bits of the data word (shifted in both by the rotation circuitry 120 and also the permutation circuitry 140) are masked with a predetermined value set in dependence on the type of shift (logical or arithmetic) and direction of shift.

The masked data word generated at the step S7 is then passed in parallel to a step S8 in which it is stored into the register file 6, a step S9 in which it is subject to zero detection, a step S10 in which it is subject to carry detection, and a step S11; where it is subject to sign detection. When each of the steps S8 to S11 has completed, the process ends at a step S12.

Second Embodiment of the Shift Circuitry

Figure 11:
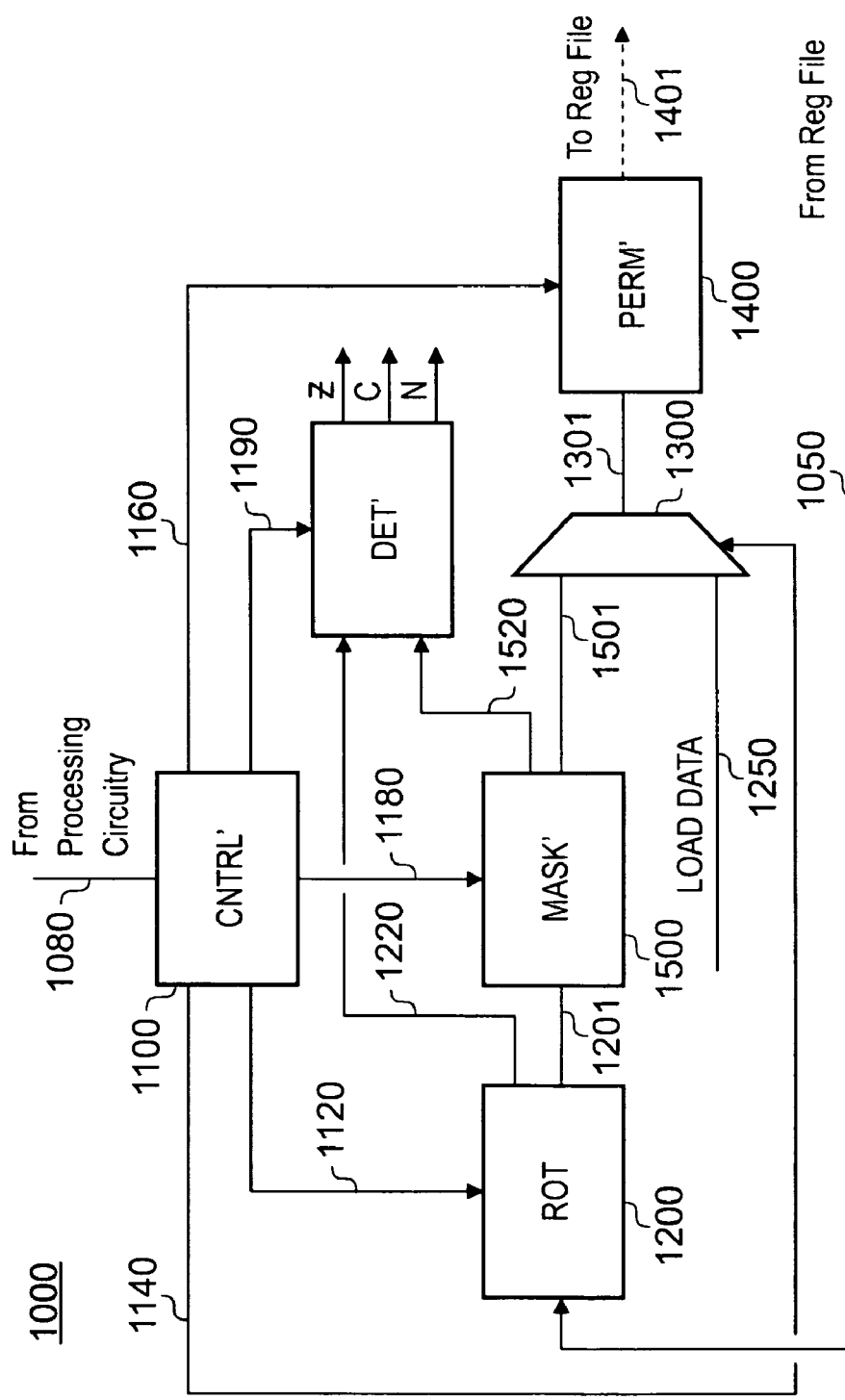
FIG. 11 schematically illustrates a barrel shifter according to a second embodiment.

Referring to FIG. 11, example shift circuitry 1000 according to a second embodiment is schematically illustrated. The shift circuitry 1000 comprises control circuitry 1100 for controlling the operation of the shift circuitry 1000 in dependence on the type of shifting operation and the amount of shift required, this information being provided to the control circuitry 1100 by the processing circuitry 5 illustrated in FIG. 1 via a line 1080. The shift circuitry 1000 comprises rotation circuitry 1200 (first shift circuitry) which is arranged to receive a data value from the register file 6 of FIG. 1 via a line 1050, and which is operable in response to a first control signal 1120 generated by the control circuitry 1100 which indicates a first shift amount $S_1$ of between zero and n bit positions, to generate a first shifted data value by shifting bit values within the received data value by the first shift amount $S_1$. It will be appreciated that n is a predetermined integer. The rotation circuitry 1200 is intended to provide bit level shifting, with byte level shifting being provided by a later stage of the shift circuitry 1000 (as will be described later). A byte usually consists of 8 bits, and in such a case the value of n would be 7, because an 8 bit shift would be handled by the later stage. In the case of a 32 bit input data word, the rotation circuitry 1200 would serve to shift the 32 bit word by between 0 (no shift) and 7 (full shift) bits. It will be appreciated that the rotation circuitry 1200 of FIG. 11 is functionally and structurally similar to the rotation circuitry 120 of FIG. 2.

However, whereas in FIG. 2 the output of the rotation circuitry 120 is passed to the multiplexer 130, in FIG. 11 the output of the rotation circuitry 1200 is subject to a partial masking step prior to being passed to a multiplexer 1300. In particular, masking circuitry 1500 is arranged to receive the shifted data value produced by the rotation circuitry 1200 on a signal line 1201. Unlike the masking circuitry 150 of FIG. 2, which operates on all 32 bits of the shifted data word by setting either the shifted in LSBs or MSBs of the 32 bit data word to a predetermined value, the masking circuitry 1500 of FIG. 11 only operates on the most significant byte (8 MSBs) of the shifted data word generated by the rotation circuitry 1200. This is because the rotation circuitry 1200 conducts less than one byte of shifting. As indicated previously, when a right shift operation is conducted, the shifted in MSBs are to be replaced with a predetermined value, whereas when a left shift operation is conducted, the shifted in LSBs are to be replaced with a predetermined value.

Where part of the shift is provided by the rotation circuitry 1200, the masking operation takes place in accordance with this rule on the shifted in portion of the most significant byte. For example, in the case of a right shift of 5 bit positions, bits will be shifted in to the 5 most significant bit positions of the most significant byte position, and thus the 5 most significant bit positions of the most significant byte are to be masked. In the case of a left shift of 5 bits positions, the required right shift will be 32−5=27 bit positions. This requires a 3 byte right shift (24 bits) using the permute circuitry to be described later, combined with a 3 bit right shift using the rotation circuitry. In this case, the 5 least significant bit positions of the most significant byte position are to be masked. The 3 least significant bytes of the shifted data word pass through the masking stage without alteration.

The masking circuitry 1500 therefore sets the bits shifted in to the most significant byte of the data value to a particular value (0 or 1) in dependence on a second control signal 1180 generated by the control circuitry 1100. The particular value selected by the masking circuitry depends on the type of shift (arithmetic or logical), and whether the shift is a left shift or a right shift (as indicated above, a left shift is implemented in the example architecture by way of a complementary right shift, but would be masked differently than a right shift). In particular, an arithmetic left shift would be masked by setting the shifted in least significant bits (which have wrapped around from the most significant bit positions) to a value of zero, and an arithmetic right shift would be masked by setting the shifted in most significant bits (which have wrapped round from the least significant bit positions) to match the sign bit of the original data value. Furthermore, a logical shift to the left or right would be masked by setting the shifted in least significant bits and most significant bits respectively to a value of zero.

The masking circuitry 1500 then outputs the masked and shifted data word to the multiplexer 1300 and also to the detection circuitry 1600 on a signal line 1501.

The multiplexer 1300 (selection circuitry) receives at its inputs the masked and shifted data word output from the masking circuitry 1500 and a load data value received from a memory on a signal line 1250. The multiplexer 1300 is responsive to a third control signal 1140 generated by the control circuitry 1100 to select between the masked and shifted data value and the load data value. The third control signal 1140 will select which input of the multiplexer 1300 to pass to the next stage of the shift circuitry 1000 in dependence on the type of data processing operation being conducted (e.g. load data operation vs. arithmetic or logical shift operation). As will be appreciated, while a data value retrieved from the register file to be shifted may require any shift amount at a bit-level granularity, a load data value to be stored from the main memory 3 into the register file 6 of FIG. 1 only requires byte level shifting in order to align a desired byte of the load data value at the least significant byte position of a register. Accordingly, the load data does not pass through the rotation circuitry 1200. Moreover, as a result of the fact that only byte level shifting of the load data value is required, it follows that only byte level masking will be required. Accordingly, there is also no requirement for the load data to pass through the masking circuitry 1500 which provides the bit level masking.

Whereas in FIG. 2 the detection circuitry 160 received and operated on the finally shifted data word, in the second embodiment shown in FIG. 10 detection circuitry 1600 receives and operates on the bit level shifted data word output from the rotation circuitry 1200 on a signal line 1220 and the masked data word output from the masking circuitry 1500 on a signal line 1520. In this way, the detection circuitry 1600 is provided prior to the introduction of the load data into the barrel shifter, thus removing the detection circuitry from the critical path followed by the load data. The detection circuitry 1600 comprises several separate circuits which set flags indicative of various characteristics of the data value which is being stored into the register file. In particular, the detection circuitry 1600 comprises zero-detection circuitry for detecting whether the value being stored into the register file is a zero or non-zero value, and setting a zero-flag accordingly. The detection circuitry 1600 also comprises carry detection circuitry for detecting the last bit to be shifted out of the most significant bit position (and therefore out of the data value), and setting a carry flag accordingly. The detection circuitry 1600 also comprises negative detection circuitry for detecting whether the value being stored in the register file is a negative value, and setting a negative flag accordingly. The flags thus set can be used (tested) by the processing circuitry 5 to determine whether a data processing instruction is to be executed (that is, execution of the instruction may be contingent on the value of the zero, carry or negative flags). The flags may be set in a status register within the register file. The control circuitry 1100 controls the operation of the detection circuitry by way of a fourth control signal 1190.

Permutation circuitry 1400 (second shift circuitry) is arranged following the multiplexer 1300 to receive the data value selected by the multiplexer 1300. The permutation circuitry 1400 is responsive to a fifth control signal generated by the control circuitry 1100 indicating a second shift amount $S_2$ of a×(n+1) bit positions to generate a second shifted data value for output to the register file on an output line 1401 by shifting bit values within the received selected data value by the second shift amount $S_2$. It will be appreciated that a may be zero (if the total amount of shift required is less than one byte) or an integer. The second shift amount $S_2$ will therefore be an integer number of bytes, in contrast with the first shift amount $S_1$ which is an integer number of bits.

Accordingly, in combination, the rotation circuitry 1200 and the permutation circuitry 1400 are able to provide a full range of shift. For example, for a 32 bit (four byte) data word (retrieved from a 32 bit register), $S_1$ will be in the range of 0 to 7 bits, whereas $S_2$ will be in the range of 0 to 3 bytes (0, 8, 16 or 24 bits). In combination this provides a range of 0 to 31 bit positions of shift (31=24+7).

As indicated above, the masking circuitry 1500 provides bit level masking of the most significant byte position of the data word. Byte level masking is conducted by the permutation circuitry 1400 in dependence on a control signal generated by the control circuitry 1100. In particular, the permutation circuitry 1400 is operable to permute the order of the bytes in the data word as described above, but is also able to replace all bits of one or more of the bytes with a predetermined value (0 or 1) in accordance with the direction of shift, the type of shift (logical or arithmetic) and the amount of shift $S_2$.

The rotation circuitry 1200 of the second embodiment takes the same form as the rotation circuitry 120 shown in FIG. 3. The function and operation of the rotation circuitry 1200 can thus be understood from FIG. 3 and the related passages above relating to the rotation circuitry 120. The difference between the rotation circuitry 120 and the rotation circuitry 1200 is that the output of the rotation circuitry 120 is directly to the multiplexer 130, whereas the output of the rotation circuitry 1200 is to the masking circuitry 1500.

Figure 12:
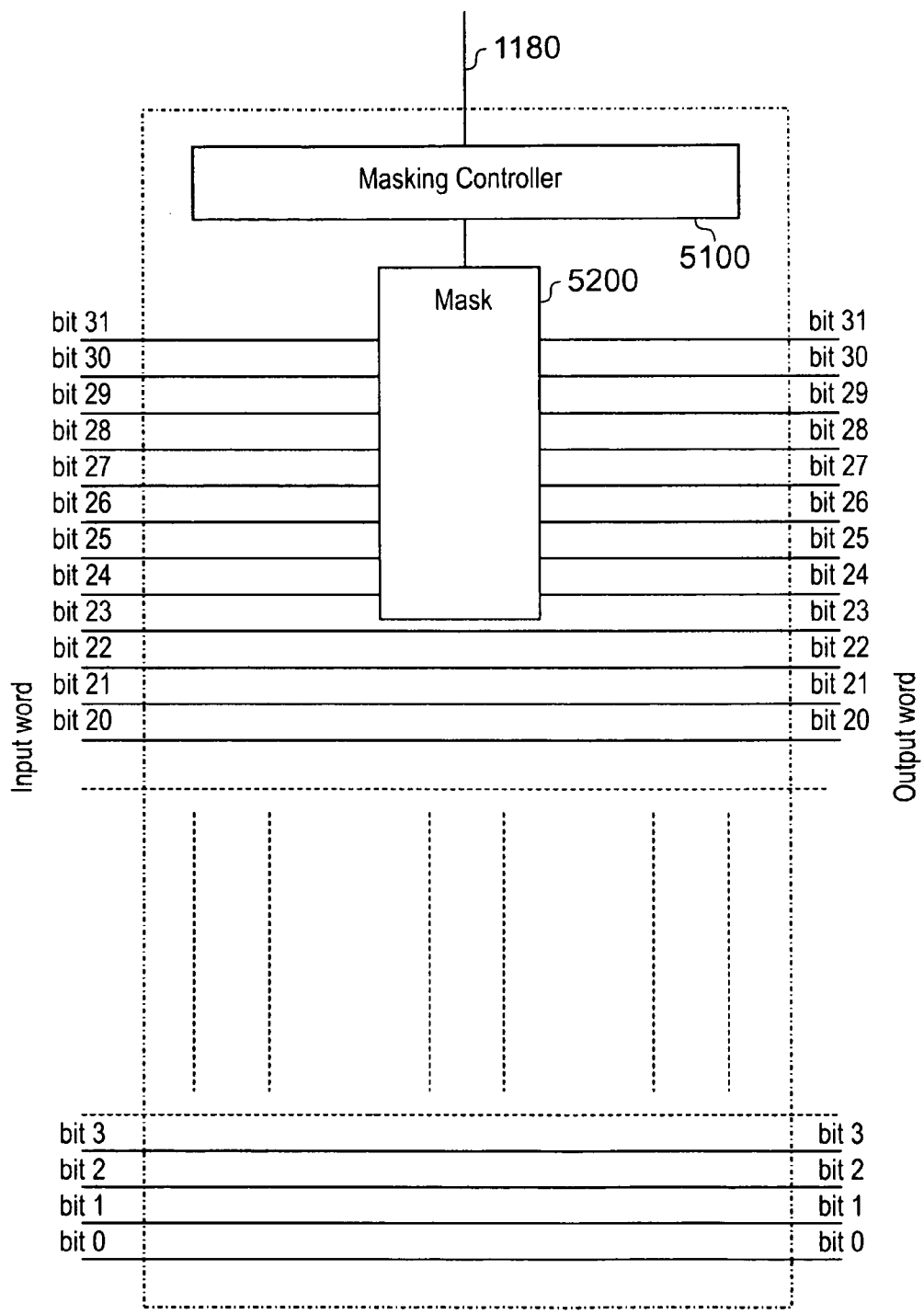
FIG. 12 schematically illustrates masking circuitry according to the second embodiment for masking a portion of the shifted data word.

Referring to FIG. 12, an example of the masking circuitry 1500 of FIG. 11 is schematically illustrated. In FIG. 12, a masking controller 5100 is shown which receives control signals 1180 from the control circuitry 1100 of FIG. 11, and which controls the operation of a mask 5200 which serves to selectively mask the bit values of a portion of the data word outputted from the rotation circuitry 1200. In particular, the masking controller 5100 receives the control signal from the control circuitry 1100 which indicates the amount of bit-level shift ($S_1$), the direction of shift (left or right), and the type of shift operation (logical or arithmetic). The direction of shift and the type of shift are together used to determine the predetermined value to which shifted in bit values are to be masked. Specifically, for an arithmetic left shift a predetermined value of zero will be set in the mask, for an arithmetic right shift a predetermined value would be set to match the sign bit of the original (unshifted) data value, and for a logical left or right shift a predetermined value of zero will be set in the mask. The direction of shift and the total amount of shift are together used to determine which bits of the mask should be applied to replace the input data bits of the data word. For example, for a 5 bit shift to the right, the 5 MSBs (bits 27 to 31) will be replaced with the predetermined value set in the mask, and for a 5 bit shift to the left, the 5 LSBs (bits 0 to 4) will be replaced with the predetermined value set in the mask.

Whereas in the masking circuitry 150 shown in FIG. 5 all 32 bits of the data word are potentially subject to masking, in the masking circuitry 1500 of FIG. 12, only the most significant byte of the data word is subject to masking. In other words, the masking circuitry 1500 only provides bit level masking of the most significant byte. The remaining bytes of the data word are allowed to progress through the masking stage unmasked, with masking being carried out on a byte level for these remaining bytes at the later permutation stage.

At the left hand side of FIG. 12, each of bits 24 to 31 of the data word is input to the mask 5200. As set out above, the mask 5200 serves to select between each input data bit of the most significant byte and a predetermined value specified in the mask 5200 under the control of the masking controller 5100. By selectively applying the mask, each of bits 24 to 31 of the data word output from the mask 5200 (shown at the right hand side of FIG. 5) will either retain its unmasked value, or will have the masked (predetermined) value. Each of bits 0 to 23 will retain its unmasked value by virtue of bypassing the mask 5200. The output data word is then passed to the multiplexer 1300 and the detection circuitry 1600.

Figure 13:
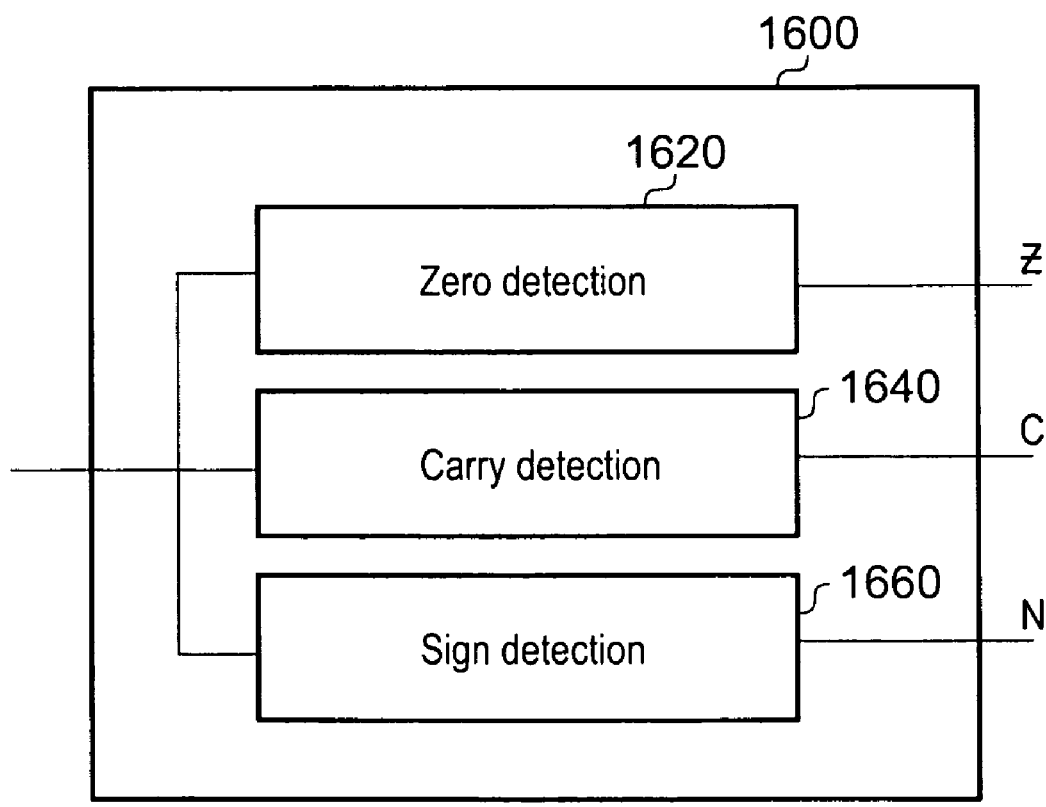
FIG. 13 schematically illustrates detection circuitry according to the second embodiment.

The detection circuitry 1600, as with the detection circuitry 160 of FIG. 2, comprises several component detection circuits for setting various status flags. As shown in FIG. 13, these include zero detection circuitry 1620 for setting a flag (z) indicative of whether the data word being written into the register file has a zero value, carry detection circuitry 1640 for setting a flag (C) indicative of the last bit shifted out of the data word (effectively bit 32), and sign detection circuitry 1660 for setting a flag (N) indicative of whether the data word being written into the register file has a positive or negative value. The flags generated by the zero detection circuitry 1620, the carry detection circuitry 1640 and the sign detection circuitry 1660 are output by the respective circuits and stored into a status register within the register file. Each of the zero detection circuitry 1620, the carry detection circuitry 1640 and the sign detection circuitry 1660 will now be described with reference to FIGS. 14, 15 and 16 respectively.

Figure 14:
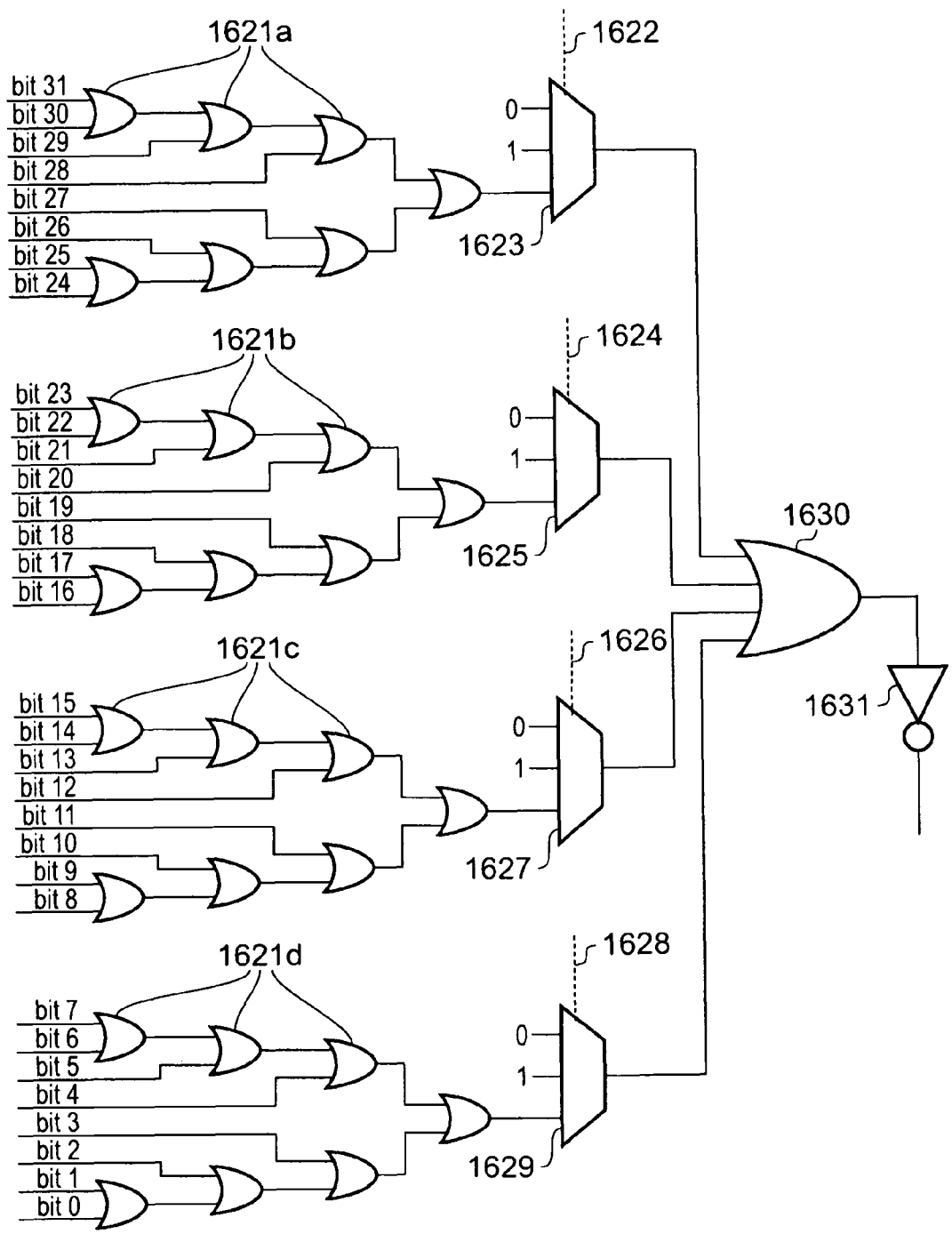
FIG. 14 schematically illustrates zero detection circuitry according to the second embodiment.

Referring to FIG. 14, an example of the zero-detection circuitry 1620 shown in FIG. 13 is schematically illustrated. The function of the zero-detection circuitry 1620 is to determine whether the data word which is being stored into the register file has a zero value or a non-zero value, and to output a flag to indicate this. The flag may then be stored in the register file (for example) as part of a status register. It will be understood that the data word will have a zero value only if every bit of the data word has a value of zero. In this case, the zero flag will be set to z=1. Otherwise the data word will be considered to have a non-zero value, and the zero flag will be set to z=0.

Whereas in the zero detection circuit 162 of FIG. 7 all of the bits of the fully shifted data value are combined with an OR operation, this technique will not work for the zero detection circuit 1620 because the zero detection operation takes place on a partially masked data word. It is therefore necessary to adapt the zero detection circuitry to take this into account.

In effect, all bits of each byte are subject to an OR operation using OR gates 1621a, 1621b, 1621c, 1621d respectively to determine whether or not all bits of the byte are zero (giving a result of zero), or whether one or more bits of the byte have a value of one (giving a result of one). A detailed explanation of such a process has already been provided above with reference to FIG. 7, and will not be repeated here. The result generated in respect of each byte is then applied to a third input of a respective multiplexer 1623, 1625, 1627, 1629 which selects between the result value, a first input having a value of zero and a second input having a value of one in dependence on a control signal 1622, 1624, 1626, 1628 received from the control circuitry 1100. The first input to the multiplexer is then output if the control signal 1622, 1624, 1626, 1628 indicates that the byte to which the multiplexer corresponds will be masked to a value of zero at the permute operation. Alternatively, the second input to the multiplexer is output if the control signal indicates that the byte to which the multiplexer corresponds will be masked to a value of one at the permute operation. The third input (result value) will be output if the control signal indicates that the current byte will be present (rather than masked out) in the final output data word. In this way, the output of the multiplexer will accurately represent whether the corresponding byte of the fully shifted data value will have a zero or non-zero value. The outputs of each multiplexer are then passed to a final OR gate 1630, which will then output a value of zero if the output of each multiplexer is zero, or will output a value of one if one or more of the multiplexers outputs a value of one. The output of the OR gate is then inverted by an inverter 1631 to generate the zero flag value z. It will be appreciated from this arrangement that z=1 if all of the bits of the data word to be finally output (after rotation, masking and permuting) are to be zero, otherwise z=0.

Figure 15:
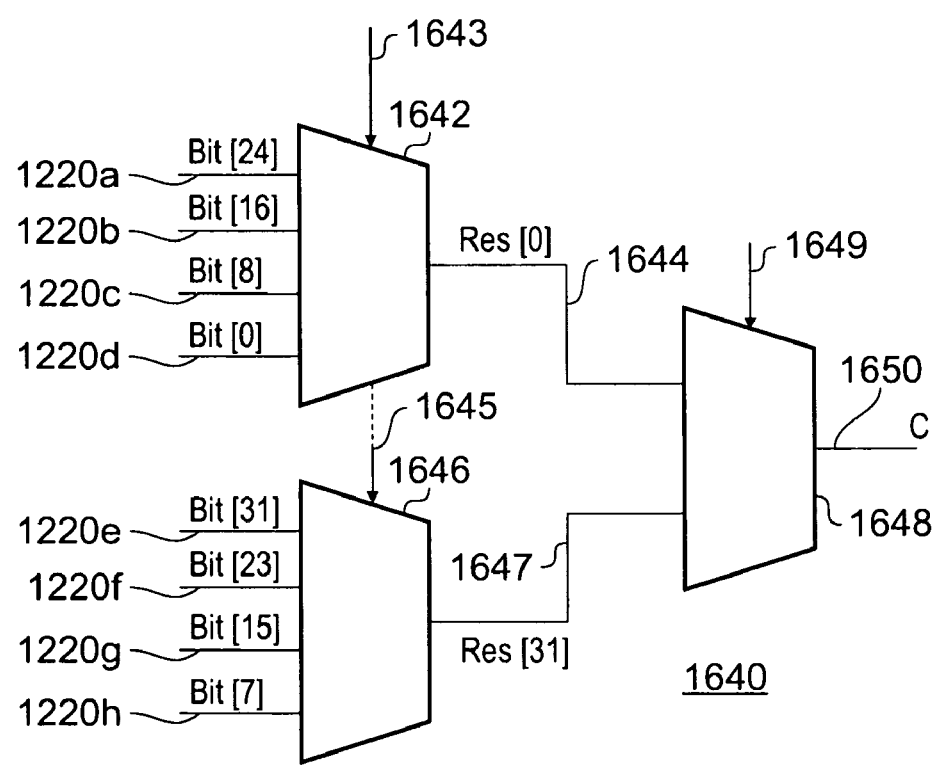
FIG. 15 schematically illustrates carry detection circuitry according to the second embodiment.

Referring to FIG. 15, an example implementation of the carry detection circuitry 1640 shown in FIG. 13 is schematically illustrated. The function of the carry-detection circuitry 1640 is to determine the value of the last bit to be shifted out from either the most significant bit position (in the case of a left shift) or the least significant bit position (in the case of a right shift) of the input data word, and to output a carry flag (C) to indicate this. The carry flag may then be stored in the register file (for example) as part of a status register. While in the case of the carry detection circuitry 164 of the first embodiment the determination of the last bit to be shifted out could be achieved by simply selecting between bit 0 and bit 31 of the shifted (but not masked) data value in dependence on the direction of shift, in the case of the second embodiment a different arrangement is required in view of the combined masking and permuting operation carried out by the permutation circuitry 1400. In particular in the second embodiment the carry flag is extracted from one of the eight possible bit positions in the data value generated by the rotation circuitry 1200 which could correspond to bit position 0 or 31 of the fully shifted and masked output data value.

In order to achieve this, the carry detection circuitry 1640 comprises a first multiplexer 1642 which receives bits 0, 8, 16 and 24 of the data value generated by the rotation circuitry 1200 via the signal line 1220 and a second multiplexer 1646 which receives bits 7, 15, 23 and 31 of the data value generated by the rotation circuitry 1200 via the signal line 1220. In particular, the first multiplexer 1642 receives bit 0 at a signal input 1220*a*, bit 8 at a signal input 1220*b*, bit 16 at a signal input 1220*c* and bit 24 at a signal input 1220*d*. Further, the second multiplexer 1646 receives bit 7 at a signal input 1220*e*, bit 15 at a signal input 1220*f*, bit 23 at a signal input 1220*g* and bit 31 at a signal input 1220*h*. The first multiplexer 1642 is arranged to select between the inputted bits in dependence on a select signal 1643 generated by the control circuitry 1100, which is dependent on the amount of shift to be applied by the barrel shifter. In particular, the select signal 1643 selects bit 24 for output by the multiplexer 1642 in the case of an amount of shift of between 24 and 31 bit positions, bit 16 for output in the case of an amount of shift of between 16 and 23 bit positions, bit 8 for output in the case of an amount of shift of between 8 and 15 bit positions, and bit 0 for output in the case of an amount of shift of between 0 and 7 bit positions. The bit value of the selected input bit is then output on a signal line 1644 as result res [0].

Similarly, the second multiplexer 1646 is arranged to select between the inputted bits in dependence on an applied select signal 1645, which is dependent on the amount of shift to be applied by the barrel shifter. In particular, the select signal 1645 selects bit 7 for output by the multiplexer 1646 in the case of an amount of shift of between 24 and 31 bit positions, bit 15 for output in the case of an amount of shift of between 16 and 23 bit positions, bit 23 for output in the case of an amount of shift of between 8 and 15 bit positions, and bit 31 for output in the case of an amount of shift of between 0 and 7 bit positions. The bit value of the selected input bit is then output on a signal line 1647 as resultres[31].

A third multiplexer 1648 is provided to receive the respective outputs of the first multiplexer 1642 and the second multiplexer 1646. The third multiplexer 1648 is responsive to a control signal 1649 which indicates the direction of the shift operation to select between res [0] provided on the signal line 1644 and res [31] provided on the signal line 1647. In particular, the third multiplexer 1648 is arranged to select res [0] for output in the case that the control signal 1649 indicates a left shift, and is arranged to select res [31] for output in the case that the control signal 1649 indicates a right shift. The bit value (res [0] or res [31]) selected by the third multiplexer 1438 is then output on an output line 1650 as the carry flag C to be written to the register file.

Figure 16:
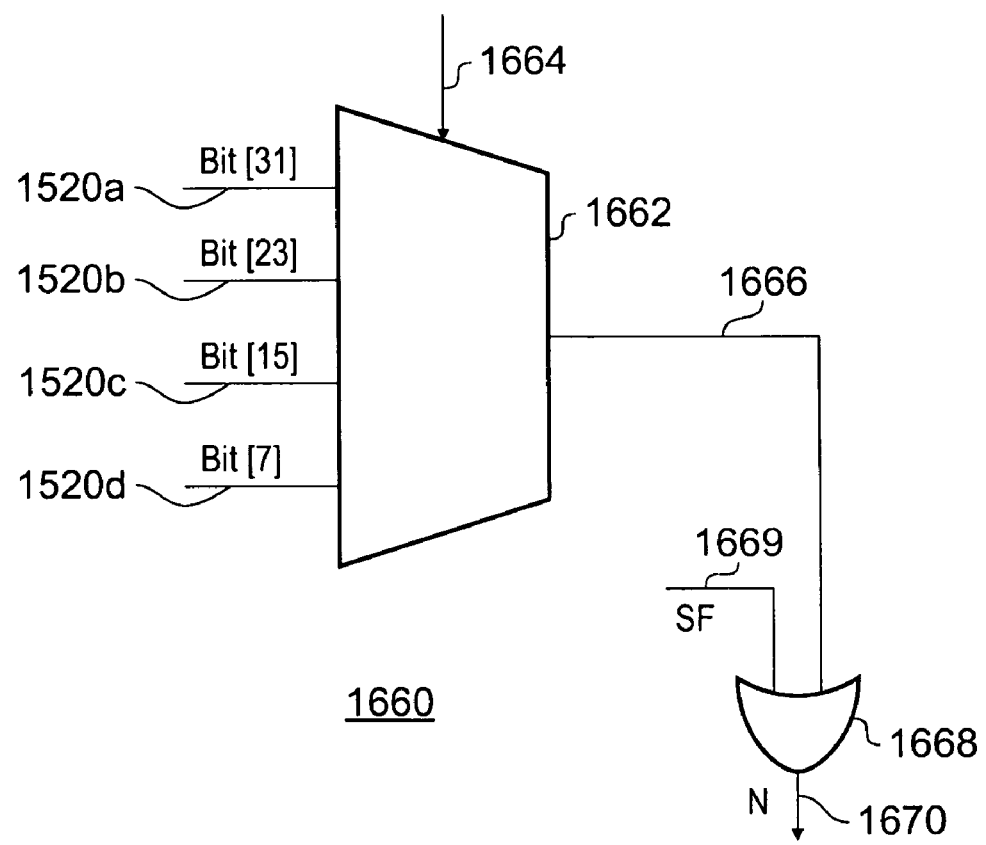
FIG. 16 schematically illustrates sign detection circuitry according to the second embodiment.

Referring to FIG. 16, an example implementation of the sign detection circuitry 1660 of the second embodiment is schematically illustrated an example implementation of the carry detection circuitry 164 shown in FIG. 6 is schematically illustrated. The function of the carry-detection circuitry 164 is to determine the value of the last bit to be shifted out from either the most significant bit position (in the case of a left shift) or the least significant bit position (in the case of a right shift), and to output a carry flag (C) to indicate this. The carry flag may then be stored in the register file (for example) as part of a status register. The sign detection circuitry 1660 comprises a multiplexer 1662 which receives bits 31, 23, 15 and 7 generated by the masking circuitry 1500 on the signal line 1520. In particular, the multiplexer 1662 receives bit 31 at a signal input 1520*a*, bit 23 at a signal input 1520*b*, bit 15 at a signal input 1520*c* and bit 7 at a signal input 1520*d*. The bits 7, 15, 23 and 31 represent the possible most significant bit positions of the data value to be output by the barrel shifter as a result of the possible permutations which can be provided by the permutation circuitry 1400. The multiplexer 1662 is operable to select between inputted bits 7, 15, 23 and 31 in dependence on a selection signal 1664 from the control signal which is dependent on the direction of and amount of shift which is to be provided by the barrel shifter. More particularly, the select signal 1664 selects bit 7 for output by the multiplexer 1646 in the case of an amount of shift of between 24 and 31 bit positions, bit 15 for output in the case of an amount of shift of between 16 and 23 bit positions, bit 23 for output in the case of an amount of shift of between 8 and 15 bit positions, and bit 31 for output in the case of an amount of shift of between 0 and 7 bit positions. The bit value of the selected input bit is then output on a signal line 1666 and provided to an OR gate 1668.

As will be explained in detail subsequently with reference to FIG. 17, byte level masking is carried out by the permutation circuitry 1400 along with byte level shifting. Accordingly, the values of one or more of bits 7, 15, 23 and 31 received at the detection circuitry 1600 may not reflect their final output value (after byte level masking) because in the case of an arithmetic shift to the right, these bits may be masked to a value of 1. It will therefore be understood that it is necessary for the sign detection circuitry 1660 to take into account whether the selected one of bits 7, 15, 23 and 31 will subsequently be forced to a value of 1, and if so, to replace the selected bit value with a value of 1. In order to achieve this, the other input of OR gate 1668 receives a sign force (SF) signal 1669 indicating whether the permutation circuitry 1400 is to fill the most significant byte with ones. The output of the OR gate 1668 on a signal line 1670 provides the negative flag (N) which is to be written into the register file.

In parallel with the detection circuitry 1600, the output of the masking circuitry 1500 is passed to the multiplexer 1300. The multiplexer 1300 selects between the rotated and masked data word and load data under the control of the control circuitry 1100, which makes the selection based on the type of data processing instruction currently being processed. The selected data word is then passed to the permutation circuitry 1400 for processing.

Figure 17:
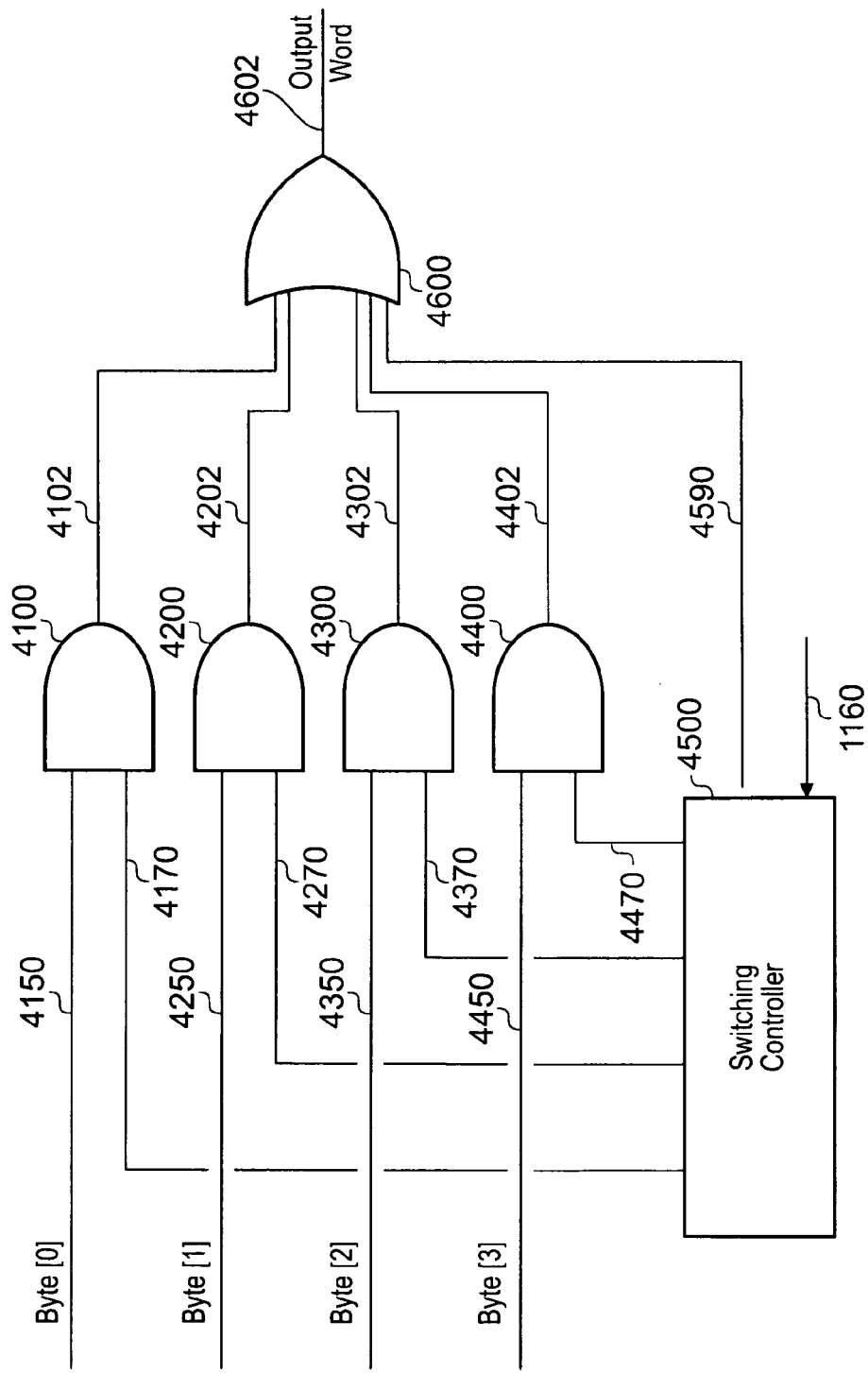
FIG. 17 schematically illustrates permutation circuitry for conducting byte level shifting according to the second embodiment.

Referring to FIG. 17, an example of the permute circuitry 1400 of FIG. 11 is schematically illustrated. The permute circuitry 1400 comprises four AND gates 4100, 4200, 4300, 4400 which receive the four bytes which make up the output of the multiplexer 1300. In particular, the first AND gate 4100 receives the first byte (8 MSBs) of the output of the multiplexer 1300 on an input line 4150, the second AND gate 4200 receives the second byte of the output of the multiplexer 1300 on an input line 4250, the third AND gate 4300 receives the third byte of the output of the multiplexer 1300 on an input line 4350, and the fourth AND gate 4400 receives the fourth byte (8 LSBs) of the output of the multiplexer 1300 on an input line 4450.

The permute circuitry 1400 also comprises a switching controller 4500 which selects between the AND gates 4100, 4200, 4300, 4400 for output, via respective output lines 4102, 4202, 4302, 4402, to an OR gate 4600 in response to the control signal 1160 generated by the control circuitry 1100. The OR gate 4600 performs a logical OR operation to output a permuted data word to the masking circuitry 1500 via an output line 4602. In addition, the switching controller comprises a masking line 4590 for inputting a masking value of zero or one to the OR gate 4600. The switching controller outputs control signals to the AND gates 4100, 4200, 4300, 4400 on respective input lines 4170, 4270, 4370, 4470 which are then subject to a logical AND operation with the data values at the input lines 4150, 4250, 4350, 4450. In this way, by asserting a zero value on three of the input lines 4170, 4270, 4370, 4470, the respective AND gates will output a value of zero onto their respective output lines, and by asserting a value of one on the remaining input line, the output of the AND gate corresponding to the remaining input line will be that of the byte value received at the respective input line 4150, 4250, 4350, 4450. The switching controller 4500 is thus able to control the order in which the input bytes on the input lines 4150, 4250, 4350, 4450 are output to the OR gate 4600. In addition, by asserting a zero value on all of the input lines 4170, 4270, 4370, 4470 and asserting a mask value on the line 4590 to the OR gate 4600, a predetermined value can be output from the OR gate 4600 to mask one or more bytes of the output data word to the predetermined value. The predetermined value is set in dependence on the direction of shift and the type of shift operation (logical or arithmetic). The determination of whether a byte is to be replaced with the predetermined value by asserting a zero value on all of the input lines 4170, 4270, 4370, 4470 and asserting a mask value on the line 4590 is made in dependence on the direction of shift and the amount of shift.

In this way, the permute circuitry can provide both a byte level shifting function and a byte-level masking function. A logical shift to the right of one byte (8 bits) can be implemented by the switching controller 4500 by applying a value of zero firstly to the input line 4590 (and a value of zero to each of the input lines 4170, 4270, 4370, 4470) in order to firstly output a value of zero to the OR gate 4600, thereby masking the most significant byte of the output data word which would otherwise include shifted in data values. Then, once the predetermined value of zero has been outputted by the OR gate 4600 as the first byte of the output data word, the switching controller 4500 will apply a value of one to the input line 4170 (and a value of zero to each of the input lines 4270, 4370, 4470) in order to output from the OR gate 4600 the first byte of the input data word as the second byte of the output data word. Similarly, the switching controller 4500 will subsequently apply a value of one to the input lines 427 and 437 to output the second and third bytes of the input data word as the third and fourth bytes of the output data word respectively. The fourth byte of the input data word will not be required. The same principle applies when a shift and mask of two bytes (16 bits) or three bytes (24 bits) is required.

Figure 18:
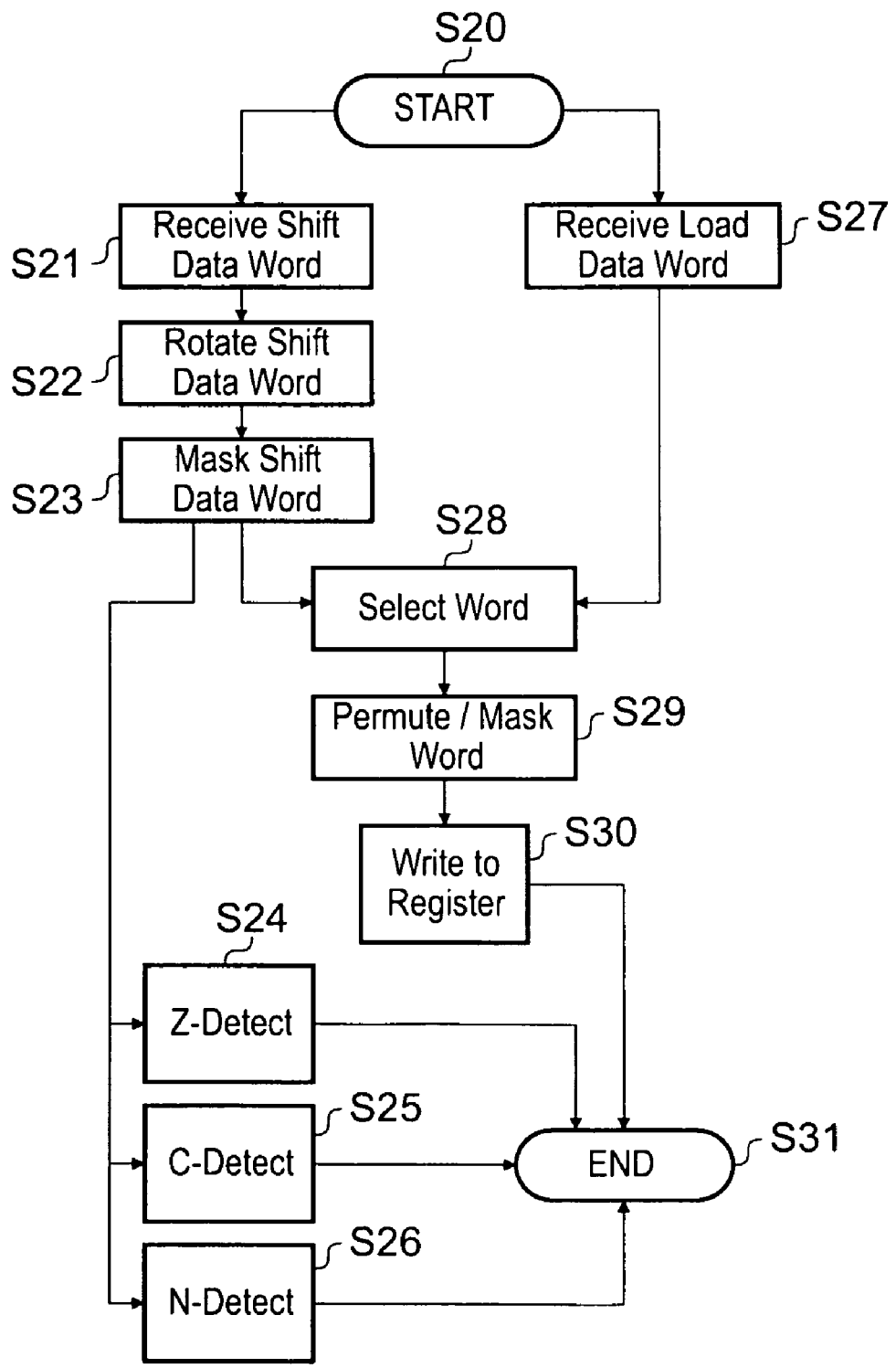
FIG. 18 is a schematic flow diagram illustrating a shifting method according to the second embodiment.

Referring to FIG. 18, an example shift operation in accordance with the second embodiment is schematically illustrated by way of a flow diagram. The process starts at a step S20 with the receipt by the processing circuitry 5 of a data processing instruction requiring either a shift operation in respect of a data word stored in the register file 6 or a load instruction for loading a data value from the main memory 3 into the register file 6. Where the instruction requires a shift operation, the process moves on to a step S21 where the shift circuitry 7 receives from the register file a data word to be shifted. At a step S22, the received data word is shifted by a number of bits derived from the data processing instruction by the control circuitry 1100. This number of bits is between 0 (no shift) and 7 (maximum bit level shift). The shifted data word is then applied to an input of the masking circuitry 1500, where at a step S23 the most significant byte of the data word is masked at a bit level. Alternatively, where the instruction requires a load operation, the process moves from the step S20 to a step S27, where a data word is retrieved from the main memory 3 and is applied to another input of the multiplexer 1300.

The masked data word generated at the step S23 is passed in parallel to the multiplexer 1300 for processing at a step S28, a step S24 in which it is subject to zero detection, a step S25 in which it is subject to carry detection, and a step S26 where it is subject to sign detection.

At the step S28, the multiplexer 1300 selects between the shifted data word and the load data applied at its respective inputs under the control of the control circuitry 1100, which determines which input to select in dependence on the data processing instruction being executed. At a step S29, the selected data word is passed to the permutation circuitry 1400 for byte-level shifting and masking whereby the bytes of the selected data word are permuted into different positions or replaced with a predetermined value in dependence on the amount of shift (in bytes) required and the direction of the required shift. Then, at a step S30, the permuted data word is written to the register file 6. When each of the steps S24, S25, S26 and S30 have completed, the process ends at a step S31.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:
1. A data processing apparatus, comprising:
processing circuitry responsive to data processing instructions to execute data processing operations;
a register file having a set of registers for storing data values for processing by the processing circuitry;
first shift circuitry arranged to receive a data value from the register file and responsive to a first control signal indicating a first shift amount $S_1$ of between zero and n bit positions to generate a first shifted data value by shifting bit values within the received data value by the first shift amount $S_1$, where n is a predetermined integer;

selection circuitry responsive to a second control signal to select between the first shifted data value and a load data value received from a memory; and second shift circuitry arranged to receive the data value selected by the selection circuitry and responsive to a third control signal indicating a second shift amount $S_2$ of $a \times (n+1)$ bit positions to generate a second shifted data value by shifting bit values within the received selected data value by the second shift amount $S_2$, where a is zero or an integer, and to output the second shifted data value to the register file.

2. A data processing apparatus according to claim 1, wherein
the second shift circuitry comprises masking circuitry responsive to a total amount of shift $S_1+S_2$ required by a data processing operation being executed to set bit values at $S_1+S_2$ most significant bit positions or least significant bit positions of the second shifted data value to a specified value.

3. A data processing apparatus according to claim 2, wherein the specified value is determined in dependence on the type of data processing operation being executed.

4. A data processing apparatus according to claim 3, wherein the type of data processing operation being executed is one of a logical shift and an arithmetic shift.

5. A data processing apparatus according to claim 1, further comprising:
zero-detection circuitry coupled to the second shift circuitry to receive the second shifted data value and determine whether the second shifted data value is zero.

6. A data processing apparatus according to claim 1, further comprising:
sign-detection circuitry coupled to the second shift circuitry to receive the most significant bit of the second shifted data value and set a sign flag in dependence on whether the most significant bit of the second shifted data value is negative.

7. A data processing apparatus according to claim 1, further comprising:
carry-detection circuitry coupled to the second shift circuitry to receive the most significant bit and the least significant bit of the second shifted data value and set a carry flag to either the most significant bit or the least significant bit of the second shifted data in dependence on the direction of the shift.

8. A data processing apparatus according to claim 1, wherein
the first shift circuitry comprises masking circuitry responsive to the amount of shift $S_1$ indicated by the first control signal to set bit values at $S_1$ most significant bit positions or least significant bit positions of the first shifted data value to a specified value.

9. A data processing apparatus according to claim 8, wherein
the second shift circuitry is responsive to the amount of shift $S_2$ indicated by the third control signal to set bit values at one or more groups of n+1 most significant bit positions or least significant bit positions of the second shifted data value to the specified value.

10. A data processing apparatus according to claim 8, wherein the specified value is determined in dependence on the type of data processing operation being executed.

11. A data processing apparatus according to claim 10, wherein the type of data processing operation being executed is one of a logical shift and an arithmetic shift.

12. A data processing apparatus according to claim 9, further comprising:
zero detection circuitry coupled to the first shift circuitry to receive the first shifted data value and to set a zero flag to indicate a zero value for the second shifted data value when each group of (n+1) bits of the first shifted data value either has a value of zero, or will be replaced with a value of zero by the second shift circuitry.

13. A data processing apparatus according to claim 9, further comprising:
sign-detection circuitry coupled to the first shift circuitry to receive the most significant bit of each group of (n+1) bit positions of the first shifted data value and to set a sign flag to indicate a positive value if the most significant bit of the group of (n+1) bit positions which is to be shifted into the most significant bit position by the second shift circuitry has a value of one, or if the bit values of that group of (n+1) bit positions are to be set to a value of one by the second shift circuitry.

14. A data processing apparatus according to claim 9, further comprising:
carry-detection circuitry coupled to the first shift circuitry to receive the most significant bit and the least significant bit of each group of (n+1) bit positions of the second shifted data value and set a carry flag to one of the received most significant bits or least significant bits in dependence on the amount and direction of the shift.

15. A data processing apparatus according to claim 1, wherein the processing circuitry comprises the first shift circuitry and the second shift circuitry.

16. A data processing apparatus, comprising:
processing means responsive to data processing instructions to execute data processing operations;
register means having a set of registers for storing data values for processing by the processing means;
first shift means arranged to receive a data value from the register means and responsive to a first control signal indicating a first shift amount of between zero and n bit positions to generate a first shifted data value by shifting bit values within the received data value by the first shift amount, where n is a predetermined integer;
selection means responsive to a second control signal to select between the first shifted data value and a load data value received from a memory; and
second shift means arranged to receive the data value selected by the selection means and responsive to a third control signal indicating a second shift amount of $a \times (n+1)$ bit positions to generate a second shifted data value by shifting bit values within the received selected data value by the second shift amount, where a is zero or an integer, and to output the second shifted data value to the register means.

17. A data processing method, comprising:
a step of executing data processing operations using a register file having a set of registers in response to data processing instructions;
a step of receiving, at first shift circuitry, a data value from the register file;
a step of generating, at the first shift circuitry, a first shifted data value by shifting bit values within the received data value by a first shift amount of between zero and n bit positions in response to a first control signal indicating the first shift amount, where n is a predetermined integer;
a step of selecting between the first shifted data value and a load data value received from a memory in response to a second control signal;

a step of receiving, at second shift circuitry, the data value selected at the step of selecting;

a step of generating, at the second shift circuitry, a second shifted data value by shifting bit values within the received selected data value by a second shift amount of a×(n+1) bit positions in response to a third control signal indicating the second shift amount, where a is zero or an integer; and a step of outputting the second shifted data value to the register file.

18. A data processing method according to claim 17, comprising a masking step, performed at the second shift circuitry, responsive to a total amount of shift $S_1+S_2$ required by a data processing operation being executed to set bit values at $S_1+S_2$ most significant bit positions or least significant bit positions of the second shifted data value to a specified value.

19. A data processing method according to claim 18, wherein the specified value is determined in dependence on the type of data processing operation being executed.

20. A data processing method according to claim 17, further comprising:

a zero-detection step of receiving, from the second shift circuitry, the second shifted data value and determining whether the second shifted data value is zero.

21. A data processing method according to claim 17, comprising a masking step, performed at the first shift circuitry, responsive to the amount of shift $S_1$ indicated by the first control signal to set bit values at $S_1$ most significant bit positions or least significant bit positions of the first shifted data value to a specified value.

22. A data processing method according to claim 21, comprising a further masking step, performed at the second shift circuitry, responsive to the amount of shift $S_2$ indicated by the third control signal to set bit values at one or more groups of n+1 most significant bit positions or least significant bit positions of the second shifted data value to the specified value.

23. A data processing method according to claim 22, further comprising:

a zero detection step of receiving the first shifted data value and setting a zero flag to indicate a zero value for the second shifted data value when each group of (n+1) bits of the first shifted data value either has a value of zero, or will be replaced with a value of zero at the further masking step.

24. A data processing method according to claim 22, further comprising:

a sign-detection step of receiving the most significant bit of each group of (n+1) bit positions of the first shifted data value and setting a sign flag to indicate a positive value if the most significant bit of the group of (n+1) bit positions which is to be shifted into the most significant bit position at the step of generating the second shifted data value has a value of one, or if the bit values of that group of (n+1) bit positions are to be set to a value of one at the further masking step.

25. A data processing method according to claim 22, further comprising:

a carry-detection step of receiving the most significant bit and the least significant bit of each group of (n+1) bit positions of the second shifted data value and setting a carry flag to one of the received most significant bits or least significant bits in dependence on the amount and direction of the shift.

\* \* \* \* \*